US009712943B2

(12) United States Patent
Kobayashi

(10) Patent No.: US 9,712,943 B2
(45) Date of Patent: Jul. 18, 2017

(54) INFORMATION PROCESSING SYSTEM, INFORMATION PROCESSING METHOD, MOBILE TERMINAL, INFORMATION PROCESSING APPARATUS, AND CONTROL METHODS AND CONTROL PROGRAMS THEREOF

(71) Applicant: Yoshikazu Kobayashi, Tokyo (JP)

(72) Inventor: Yoshikazu Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 63 days.

(21) Appl. No.: 14/387,195

(22) PCT Filed: Feb. 28, 2013

(86) PCT No.: PCT/JP2013/055548
§ 371 (c)(1),
(2) Date: Sep. 22, 2014

(87) PCT Pub. No.: WO2013/146083
PCT Pub. Date: Oct. 3, 2013

(65) Prior Publication Data
US 2015/0065111 A1 Mar. 5, 2015

(30) Foreign Application Priority Data
Mar. 24, 2012 (JP) .................................. 2012-068514

(51) Int. Cl.
*H04W 8/22* (2009.01)
*H04W 4/00* (2009.01)
(Continued)

(52) U.S. Cl.
CPC ............ *H04W 4/003* (2013.01); *G06F 9/445* (2013.01); *G06F 9/4411* (2013.01);
(Continued)

(58) Field of Classification Search
CPC ..... H04W 8/245; H04W 24/02; H04W 88/02; H04W 4/003; H04W 8/22;
(Continued)

(56) References Cited

U.S. PATENT DOCUMENTS 8,553,264 B2   10/2013   Tsutsumi
9,189,298 B2   11/2015   Chiu et al.
(Continued)

FOREIGN PATENT DOCUMENTS

CN    102123223 A    7/2011
EP     2343647 A2    7/2011
(Continued)

OTHER PUBLICATIONS

Japanese Office Action issued by the Japan Patent Office for Japanese Application No. 2012-068514 dated Jan. 5, 2016 (6 pages).
(Continued)

*Primary Examiner* — Ted Wang
(74) *Attorney, Agent, or Firm* — Wilmer Cutler Pickering Hale and Dorr LLP

(57) ABSTRACT

An apparatus of this invention is directed to an information processing apparatus that selects an appropriate combination of a device connected to a mobile terminal and a program used in the information processing apparatus to operate the device via a network and the mobile terminal, based on a history of the combination. The information processing apparatus accumulates the history of the combination of the device connected via the network and the mobile terminal, and the program used in the information processing apparatus to operate the device. When receiving information about the device connected to the mobile terminal from the mobile terminal via the network, the information processing apparatus selects the combination of the device and the
(Continued)

program based on the history of the combination of the device and the program accumulated in an accumulator.

27 Claims, 44 Drawing Sheets

(51) Int. Cl.
*G06F 9/445* (2006.01)
*H04M 1/725* (2006.01)
*G06F 9/44* (2006.01)
*H04W 88/02* (2009.01)

(52) U.S. Cl.
CPC ......... *H04M 1/72527* (2013.01); *H04W 8/22* (2013.01); *H04W 88/02* (2013.01)

(58) Field of Classification Search
CPC ......... H04M 1/72525; H04M 1/72522; H04M 1/72527; G06F 9/445; G06F 9/4414
See application file for complete search history.

(56) References Cited

U.S. PATENT DOCUMENTS

| | | | |
|---|---|---|---|
| 2001/0052007 A1* | 12/2001 | Shigezumi | H04L 29/12066 709/223 |
| 2007/0136485 A1 | 6/2007 | Mitsui | |
| 2008/0140821 A1 | 6/2008 | Tada | |
| 2011/0157631 A1 | 6/2011 | Tsutsumi | |
| 2012/0002715 A1 | 1/2012 | Matsui et al. | |
| 2013/0013776 A1* | 1/2013 | Tajima | G06Q 10/00 709/224 |
| 2016/0034374 A1 | 2/2016 | Chiu et al. | |

FOREIGN PATENT DOCUMENTS

| | | |
|---|---|---|
| JP | 2005-025677 A | 1/2005 |
| JP | 2007-102308 A | 4/2007 |
| JP | 2007-114900 A | 5/2007 |
| JP | 2011-198021 A | 10/2011 |
| WO | WO-2011/114629 A1 | 9/2011 |

OTHER PUBLICATIONS

International Search Report corresponding to PCT/JP2013/055548, dated May 28, 2013 (3 pages).
Extended European Search Report corresponding to European Patent Application No. 13769658.9, dated Dec. 15, 2015, 21 pages.
Chinese Office Action issued by the Intellectual Property Office of the People's Republic of China for Application No. 201380016322.9 dated May 30, 2016 (14 pages).
European Office Action issued by the European Patent Office for European Application No. 13769658.9 dated Feb. 27, 2017 (5 pages).
Hirofuchi, T., et al., "USB/IP—A Peripheral Bus Extension for Device Sharing over IP Network," USENIX Association, FREENIX Track: 2005 USENIX Annual Technical Conference, XP061012913, pp. 47-60 (Mar. 14, 2005).

* cited by examiner

| USER ID | MOBILE TERMINAL ID | MODEL | COMMUNICATION PERFORMANCE | DEVICE CONNECTOR | INSTALLED DEVICE DRIVER | AUDIO COMMUNICATION METHOD | DATA COMMUNICATION METHOD | ... |
|---|---|---|---|---|---|---|---|---|
| | | | | USB | | | | |
| | | | | HDMI | | | | |
| | | | | USB | | | | |
| ... | | | | | | | | |

FIG. 7

| PROGRAM TYPE | PROGRAM ID | COMMUNICATION TERMINAL | COMMUNICATION METHOD | CONNECTED CONNECTOR | CONNECTED DEVICE | CAPABILITY | ... |
|---|---|---|---|---|---|---|---|
| DEVICE DRIVER | | | | | | | |
| | ... | | | | | | |
| DRIVER APPLICATION | ... | | | | | | |
| DATA PROCESSING APPLICATION | ... | | | | | | |

| USER ID | MOBILE TERMINAL /1012 | CONNECTED DEVICE /1013 | USED DRIVER /1014 | USED APPLICATION /1015 | USE COUNT /1016 | TOTAL SATISFACTION LEVEL /1017 | AVERAGE SATISFACTION LEVEL /1018 | ANOTHER INDEX |
|---|---|---|---|---|---|---|---|---|
| | SMARTPHONE | CAMERA | | ... | | | | |
| | | DISPLAY | | ... | | | | |
| | | ... | | | | | | |
| | TABLET | KEYBOARD | | ... | | | | |
| | | ... | | | | | | |
| ... | | | | | | | | |

| 1121 MOBILE TERMINAL | 1122 CONNECTED CONNECTOR | 1123 CONNECTED DEVICE | 1124 USED DRIVER | 1125 USED APPLICATION | 1126 USE COUNT | 1127 TOTAL SATISFACTION LEVEL | 1128 AVERAGE SATISFACTION LEVEL | 1129 MAXIMUM MINIMUM SATISFACTION LEVEL | ANOTHER INDEX |
|---|---|---|---|---|---|---|---|---|---|
| SMARTPHONE | USB | KEYBOARD | | | | | | | |
| | | MOUSE | ... | | | | | | |
| | ... | ... | ... | | | | | | |
| TABLET | HDMI | DVD DRIVE | | | | | | | |
| | ... | ... | ... | | | | | | |
| ... | | | | | | | | | |

| MOBILE TERMINAL ID | USER ID | CONNECTED DEVICE | USER TASTE | | SERVER RECOMMENDED | |
|---|---|---|---|---|---|---|
| 1301 | 1302 | 1303 | 1304 | | 1305 | |
| | | | DEVICE DRIVER | DRIVER APPLICATION | DEVICE DRIVER | DRIVER APPLICATION |
| ... | ... | ... | ... | ... | ... | ... |

509a

| 2211 | 2212 | 2213 | 2214 |
|---|---|---|---|
| CONNECTED DEVICE | ENVIRONMENTAL FACTOR | SET VALUE | SATISFACTION LEVEL |
| DIGITAL CAMERA | ... | ... | |
| PRINTER | ... | ... | |
| ... | | | |

{ 2210 }

| 2221 | 2222 | 2223 | 2224 |
|---|---|---|---|
| CONNECTED DEVICE | DEVICE ENVIRONMENTAL FACTOR | MOBILE TERMINAL | SATISFACTION LEVEL |
| | ... | | |
| ... | | | |

| FIRST DEVICE | CONNECTED TERMINAL | DEVICE DRIVER | DRIVER APPLICATION | SECOND DEVICE | CONNECTED TERMINAL | DEVICE DRIVER | DRIVER APPLICATION | SATISFACTION LEVEL |
|---|---|---|---|---|---|---|---|---|
| | | | | | | ... | ... | |
| | | | | ... | | | | |
| | | | | | | | | |
| | | | | ... | ... | | | |
| | | | | | | | | |
| | ... | ... | | | | | | |
| ... | | | | | | | | |

INFORMATION PROCESSING SYSTEM, INFORMATION PROCESSING METHOD, MOBILE TERMINAL, INFORMATION PROCESSING APPARATUS, AND CONTROL METHODS AND CONTROL PROGRAMS THEREOF

CROSS-REFERENCE TO RELATED APPLICATIONS

This application is a national stage application of International Application No. PCT/JP2013/055548 entitled "Information Processing System, Information Processing Method, Mobile Terminal, Information Processing Apparatus, and Control Methods and Control Programs Thereof," filed on Feb. 28, 2013, which claims the benefit of the priority of Japanese Patent Application No. 2012-068514, filed on Mar. 24, 2012, the disclosures of each of which are hereby incorporated by reference in their entirety.

TECHNICAL FIELD

The present invention relates to a technique of selecting, based on an accumulated history, processing associated with a device connected via a network and a mobile terminal.

BACKGROUND ART

In the above technical field, patent literature 1 discloses a technique of, when a device is connected to a thin client, executing a corresponding device driver in a server. Additionally, paragraph [0020] suggests storing a plurality of device drivers in correspondence with one device.

CITATION LIST

Patent Literature

Patent literature 1: Japanese Patent Laid-Open No. 2007-102308

SUMMARY OF THE INVENTION

Technical Problem

However, the above-described literature includes neither a description nor a suggestion of selecting an appropriate device driver for the connected device, the thin client, or the server from the plurality of device drivers. Hence, the technique described in the above literature cannot select an appropriate device driver even when a plurality of device drivers exist.

The present invention enables to provide a technique of solving the above-described problem.

Solution to Problem

One aspect of the present invention provides an information processing apparatus comprising:
an accumulator that accumulates a history of a combination of a device connected via a network and a mobile terminal, and a program used in the information processing apparatus to operate the device; and
a selector that, selects the combination of the device and the program based on the history of the combination of the device and the program accumulated in said accumulator, when receiving information about the device connected to the mobile terminal from the mobile terminal via the network.

Another aspect of the present invention provides a control method of an information processing apparatus, the method comprising:
accumulating a history of a combination of a device connected via a network and a mobile terminal, and a program used in the information processing apparatus to operate the device; and
selecting the combination of the device and the program based on the history of the combination of the device and the program accumulated in the accumulator, when receiving information about the device connected to the mobile terminal from the mobile terminal via the network.

Still other aspect of the present invention provides a control program of an information processing apparatus, which causes a computer to execute:
accumulating a history of a combination of a device connected via a network and a mobile terminal, and a program used in the information processing apparatus to operate the device; and
selecting the combination of the device and the program based on the history of the combination of the device and the program accumulated in the accumulator, when receiving information about the device connected to the mobile terminal from the mobile terminal via the network.

Still other aspect of the present invention provides a mobile terminal comprising:
a connector that connects a device;
a transmitter that acquires device information for the connected device and transmits the device information to an information processing apparatus via a network; and
an instructor that instructs to transmit, to another mobile terminal, a combination of the device and a program operating the device, which is selected by the information processing apparatus based on the device information.

Still other aspect of the present invention provides an information processing system including a mobile terminal and an information processing apparatus connected to the mobile terminal via a network,
said information processing apparatus comprising:
an accumulator that accumulates a history of a combination of a device connected via the network and said mobile terminal, and a program used in said information processing apparatus to operate the device; and
a selector that selects the combination of the device and the program based on the history of the combination of the device and the program accumulated in said accumulator, when receiving information about the device connected to said mobile terminal from said mobile terminal via the network, and
said mobile terminal comprising a transmitter that transmits the information about the device connected to said mobile terminal to said information processing apparatus via the network.

Still other aspect of the present invention provides an information processing method of an information processing system including a mobile terminal and an information processing apparatus connected to the mobile terminal via a network and including an accumulator that accumulates a history of a combination of a device connected via the network and the mobile terminal and a program used in the information processing apparatus to operate the device, the method comprising:

transmitting information about the device connected to the mobile terminal from the mobile terminal to the information processing apparatus via the network; and selecting, by the information processing apparatus, the combination of the device and the program based on the history of the combination of the device and the program accumulated in the accumulator, when receiving the information about the device connected to the mobile terminal from the mobile terminal via the network.

Advantageous Effects of Invention

According to the present invention, an appropriate combination of a device connected to a mobile terminal and a program used in an information processing apparatus to operate the device via a network and the mobile terminal can be selected based on the history of combinations.

BRIEF DESCRIPTION OF DRAWINGS

FIG. 7 is a view showing the arrangement of a user registration DB according to the second embodiment of the present invention;

FIG. 9 is a view showing the arrangement of a program DB according to the second embodiment of the present invention;

FIG. 10 is a view showing a partial arrangement of a combination accumulation DB according to the second embodiment of the present invention;

FIG. 11 is a view showing a partial arrangement of the combination accumulation DB according to the second embodiment of the present invention;

FIG. 13 is a view showing the arrangement of a proposed program table according to the second embodiment of the present invention;

FIG. 22 is a view showing the arrangement of a combination accumulation DB according to the fourth embodiment of the present invention;

FIG. 28 is a view showing the arrangement of a combination accumulation DB according to the fifth embodiment of the present invention:

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

An information processing apparatus 100 according to the first embodiment of the present invention will be described with reference to FIG. 1. The information processing apparatus 100 is an apparatus that controls, via a network 130, a device 121 connected to a mobile terminal 111. Note that the information processing apparatus 100 is a server such as a cloud server but is not limited to this.

Figure 1:
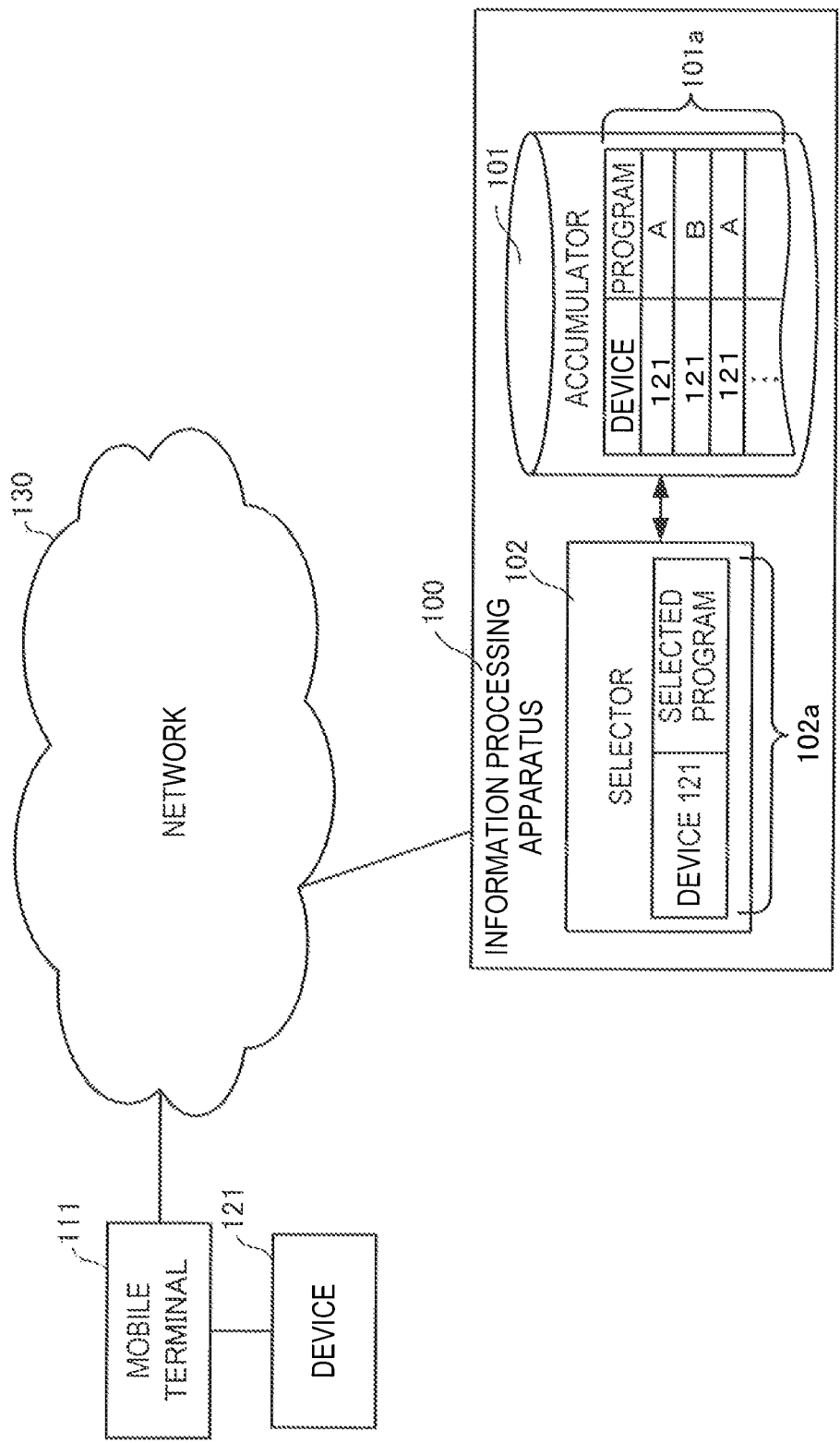
FIG. 1 is a block diagram showing the arrangement of an information processing apparatus according to the first embodiment of the present invention.

As shown in FIG. 1, the information processing apparatus 100 includes an accumulator 101 and a selector 102. The accumulator 101 accumulates a history 101a of combinations of the device 121 connected via the network 130 and the mobile terminal 111 and programs used in the information processing apparatus 100 to operate the device 121. Upon receiving, from the mobile terminal 111 via the network 130, information about the device 121 connected to the mobile terminal 111, the selector 102 selects a combination 102a of the device and a program based on the history 101a of the combinations of the device and programs accumulated in the accumulator 101.

According to this embodiment, an appropriate combination of a device connected to the mobile terminal and a program used in the information processing apparatus to operate the device via the network and the mobile terminal can be selected based on the history of combinations.

Second Embodiment

An information processing system according to the second embodiment of the present invention will be described next. In the information processing system according to this embodiment, a cloud server serving as an information processing apparatus accumulates the history of combinations of a device connected to a mobile terminal and programs used to operate the device. Upon receiving a notification representing that a device is connected to the mobile terminal, a program is selected based on the history of combinations. The program includes at least a device driver (to be also referred to as a device driver or driver hereinafter) that drives a device, and a driver application (to be also referred to as a driver application hereinafter) that controls a device via the network and the mobile terminal. The program may also include a data processing application (to be also referred to as a data processing application hereinafter) that processes input/output data. Note that in this embodiment, the information processing apparatus will be described as a server such as a cloud server. However, the information processing apparatus is not limited to a server such as a cloud server.

According to this embodiment, when a device is connected to the mobile terminal, a combination of a device driver and a driver application which appropriately control the device via the network and the mobile terminal can be selected.

Note that in this embodiment, an example in which the mobile terminal has a USB connector, and a USB device is connected via a USB cable will be described. However, connection between the mobile terminal and the device is not limited to USB.

<<Information Processing System>>

The arrangement and operation of the information processing system according to this embodiment will be described first with reference to FIGS. 2, 3, and 4A to 4D.

(Description of Operation)

Figure 2:
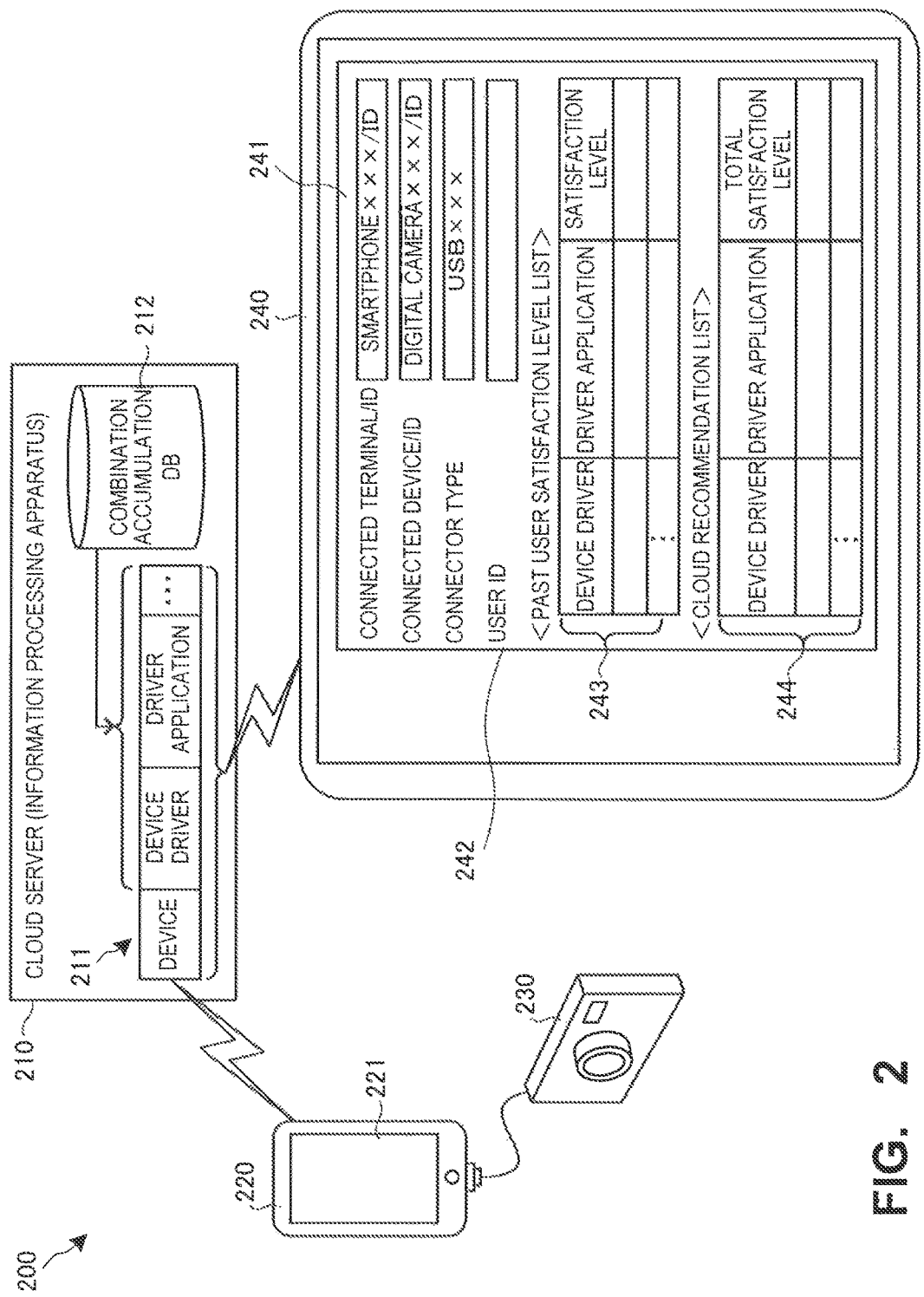
FIG. 2 is a view for explaining the operation of an information processing system according to the second embodiment of the present invention.

FIG. 2 is a view for explaining the operation of an information processing system 200 according to this embodiment.

In the information processing system 200 shown in FIG. 2, a cloud server 210 serving as an information processing apparatus, a mobile terminal 220, a device 230, and a mobile terminal 240 are illustrated. In this embodiment, the mobile terminal 220 is a smartphone, the device 230 is a digital camera, and the mobile terminal 240 is a tablet desired by the user to do proposal output of the cloud server 210. However, the arrangement is not limited to this.

In the cloud server 210, a combination selector 211 selects a program to appropriately operate the device 230 connected to the mobile terminal 220 by referring to a combination accumulation database (to be referred to as a DB hereinafter) 212 that accumulates the history of combinations of devices and programs. Note that the program to be selected includes a device driver program that drives the device 230, and a driver application program that connects the cloud server 210, the mobile terminal 220, and the device 230 via a network and controls them. The program may also include a data processing program that processes input/output data of the device 230. Note that in this specification, the device driver program will also be referred to as a "device driver", and the driver application program will also be referred to as a "driver application". The driver application program, the data processing program, a web application, and the like may simply generically be referred to as "applications".

When the device 230 is connected to the connector (for example, USB connector) of the mobile terminal 220, the cloud server 210 recognizes the device 230 via the mobile terminal 220. Appropriate combinations of device driver programs and driver application programs are selected based on the combination accumulation DB 212 that accumulates the history of programs used at the time of connection of the device 230 via the mobile terminal 220. The selected appropriate combinations of device driver programs and driver application programs are proposed in a window 242 on a display screen 241 of the mobile terminal 240. In FIG. 2, a program list 243 indicating programs used by the user of the mobile terminal 220 with high levels of satisfaction at the connection of the device 230 in the past is proposed in the window 242. In addition, a program list 244 is proposed based on the accumulation of past satisfaction levels of not the individual user but all users, and the like. Note that if the satisfaction levels of the user cannot be collected, a combination having the maximum appearance count may be selected.

Note that in FIG. 2, the program lists 243 and 244 are proposed on the mobile terminal 240 different from the mobile terminal 220 connected to the device 230. However, the program lists may be proposed on a display screen 221 of the mobile terminal 220. In this embodiment, the programs are proposed to the user, and the user makes an instruction. However, the cloud server 210 may execute a program selected based on the combination accumulation DB 212 without proposal to the user.

(Arrangement)

Figure 3:
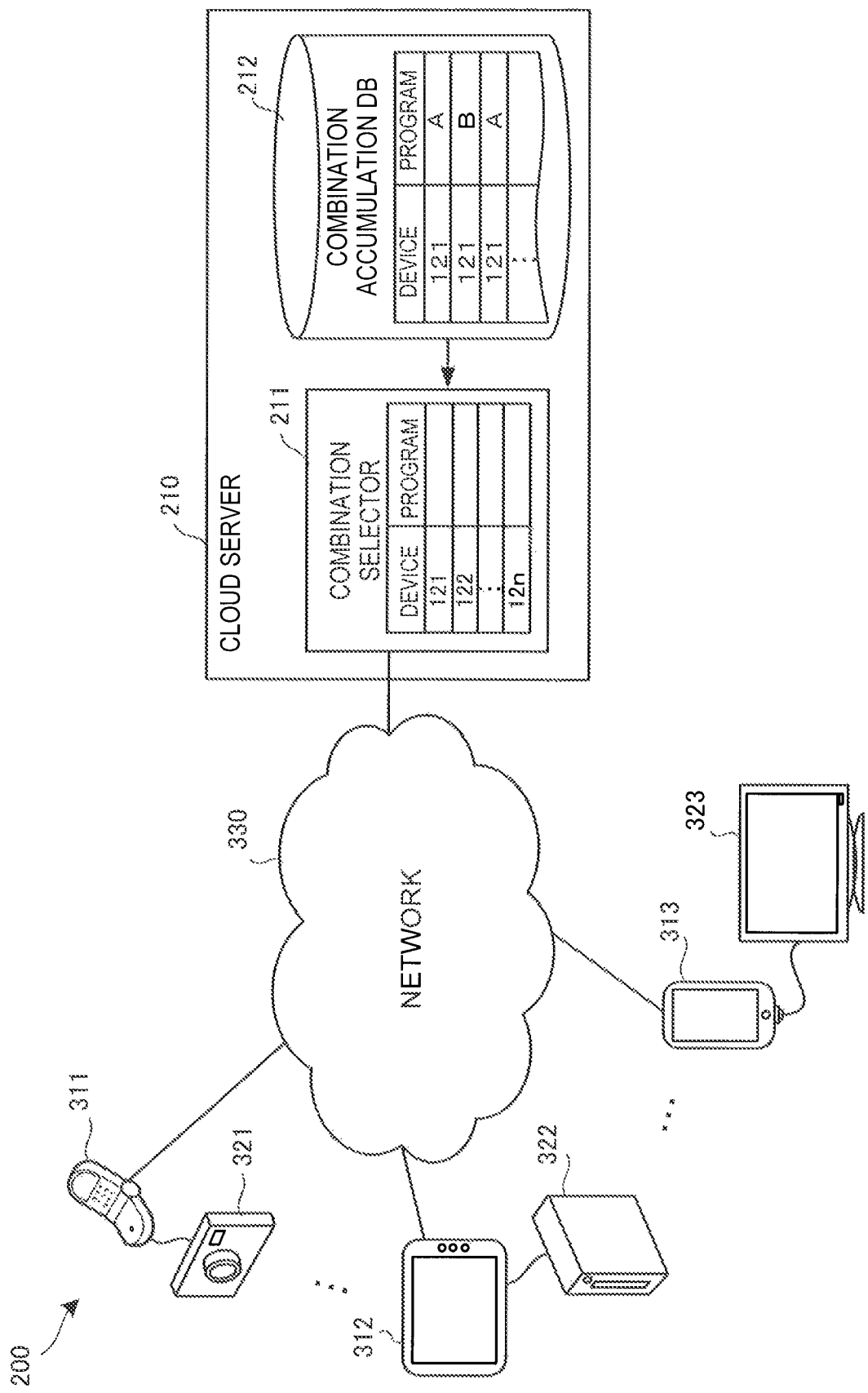
FIG. 3 is a block diagram showing the arrangement of the information processing system according to the second embodiment of the present invention.

FIG. 3 is a block diagram showing the arrangement of the information processing system 200 according to this embodiment.

As shown in FIG. 3, the information processing system 200 includes the cloud server 210 and mobile terminals 311 to 313 connected via a network 330. Devices 321 to 323 can be connected to the mobile terminals 311 to 313, respectively. For example, an image captured by the device 321 that is a digital camera is transmitted to the cloud server 210 via the mobile terminal 311 that is a mobile telephone. The image can be stored in the cloud server 210 or processed and displayed on the large display 323 via the mobile terminal 313 that is a smartphone. Alternatively, a video movie stored in the device 322 that is a DVD player can be reproduced on the tablet 312 or reproduced on the large display 323 via the cloud server 210 and then via the mobile terminal 313 that is a smartphone.

As shown in FIG. 2 as well, the cloud server 210 includes the combination accumulation DB 212 that accumulates the history of programs used at the time of connection of the device to the mobile terminal, and the combination selector 211 that selects program combinations for the device 230 at the time of connection of the device to the mobile terminal by referring to the combination accumulation DB 212.

(Operation Procedure)

Figure 4A:
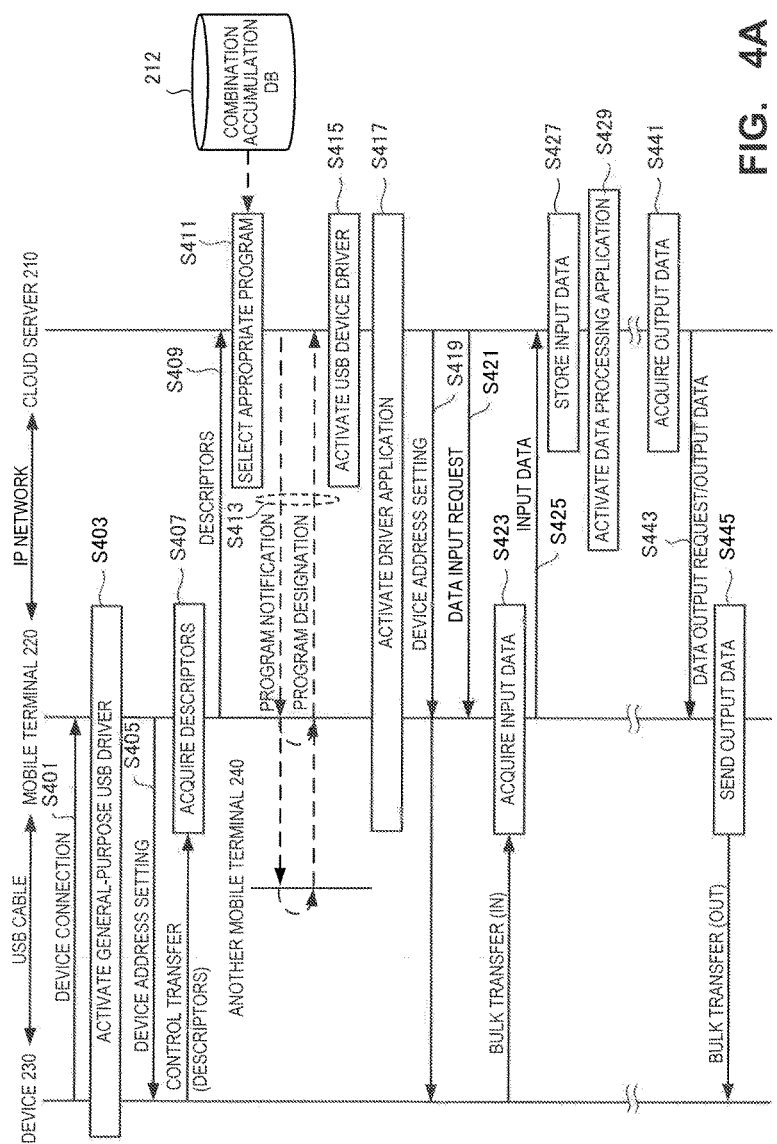
FIG. 4A is a sequence chart showing the operation procedure of the information processing system according to the second embodiment of the present invention.

FIG. 4A is a sequence chart showing the operation procedure of the information processing system 200 according to this embodiment. Referring to FIG. 4A, the device 230 and the mobile terminal 220 are connected via a USB cable, and the mobile terminal 220 and the cloud server 210 are connected via an IP network.

First, in step S401, the device 230 is connected to the USB connector of the mobile terminal 220 via a USB cable. In step S403, a general-purpose USB driver is activated to start packet exchange between the mobile terminal 220 and the device 230. The mobile terminal 220 clears the device 230 and then sets a device address using the mobile terminal 220 as a host in step S405. In step S407, the mobile terminal 220 acquires descriptors set in the device 230. The descriptors include a device descriptor, a configuration descriptor, an interface descriptor, and an endpoint descriptor. In step S409, the mobile terminal 220 IP-encapsulates the acquired descriptors and transmits them to the cloud server 210.

In step S411, the cloud server 210 selects appropriate programs to operate the device 230 connected to the mobile terminal 220 based on the combination accumulation DB 212 that accumulates the history of combinations of the device 230 and programs. In step S413, the cloud server 210 notifies the mobile terminal 220 or the other mobile terminal 240 of the selected appropriate programs and receives a designation by the user. Note that the cloud server 210 may skip step S413 and execute a selected program. In step S415, the cloud server 210 activates a USB device driver out of the selected program or the program selected and then designated by the user. In step S417, the cloud server 210 activates a driver application out of the selected program or the program selected and then designated by the user.

In step S419, the cloud server 210 sets a device address using the cloud server 210 as a host via the IP network and the mobile terminal 220. For example, when the device 230 is an input device, the cloud server 210 sends a data input request to the mobile terminal 220 in step S421. In step S423, the mobile terminal 220 acquires input data by bulk transfer (IN). In step S425, the mobile terminal 220 IP-encapsulates the input data and transmits it to the cloud server 210. In step S210, the cloud server 210 stores the input data. If data processing is necessary, the cloud server 210 activates a data processing application in step S429. Note that the data processing application is also selected in step S411.

On the other hand, when the device 230 is an output device, the cloud server 210 acquires output data in step S441. In step S443, the cloud server 210 transmits a data output request to the mobile terminal 220 together with the output data. In step S445, the mobile terminal 220 sends the decapsulated output data to the device 230 by bulk transfer (OUT).

Figure 4B:
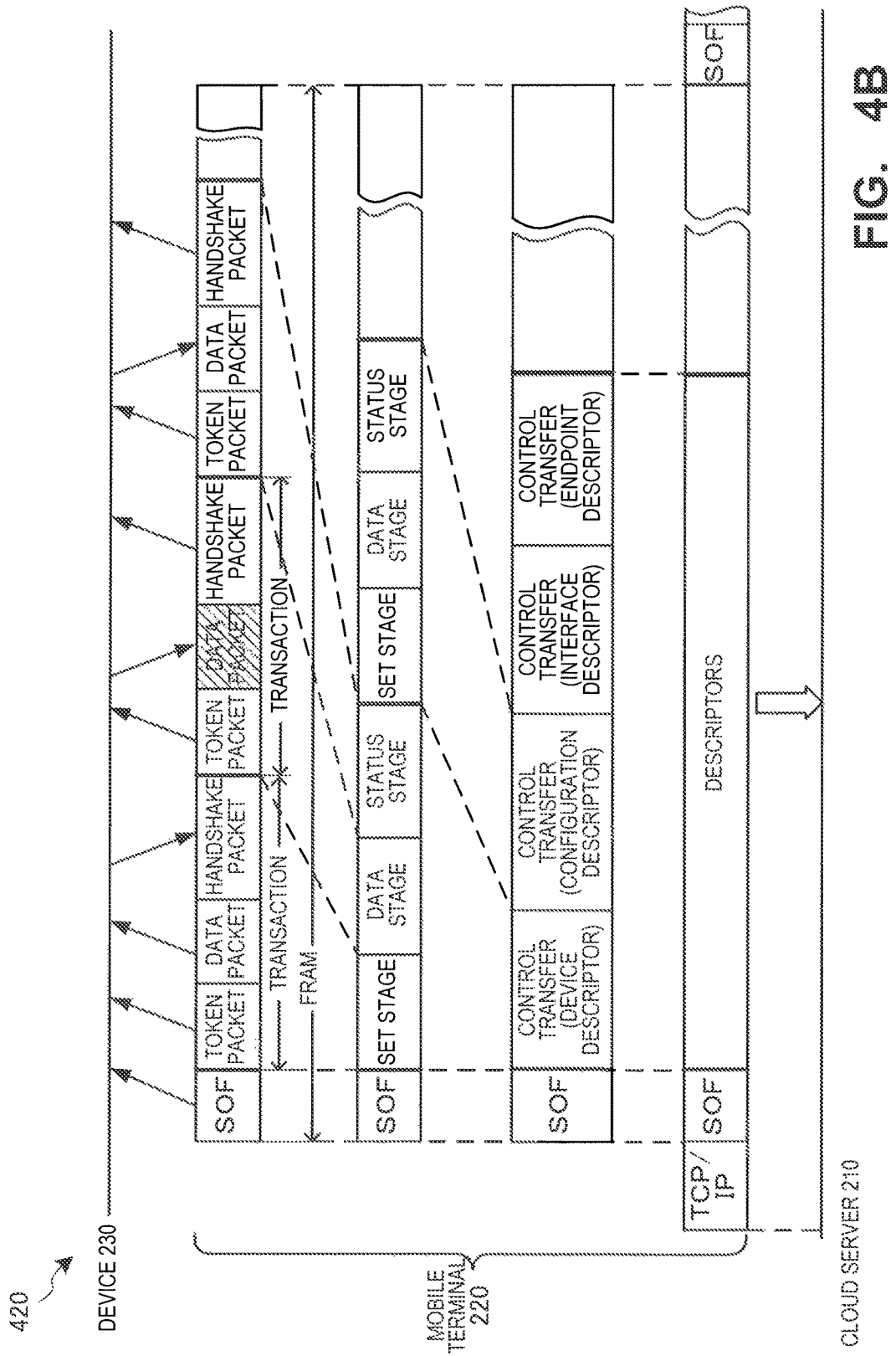
FIG. 4B is a view showing the procedure of descriptor acquisition according to the second embodiment of the present invention.

FIG. 4B is a view showing the procedure of descriptor acquisition according to this embodiment.

The descriptors set in the device 230 are acquired by a USB request such as GET_DESCRIPTOR. Each USB request is transmitted/received to/from the device 230 by control transfer. Each control transfer is formed from a set stage, a data stage, and a status stage. Each stage is formed from a token packet, a data packet, and a handshake packet. A descriptor is acquired by the data packet of each data stage.

The descriptors acquired from the device 230 are IP-encapsulated by an IP header or TCP header and transmitted from the mobile terminal 220 to the cloud server 210.

Figure 4C:
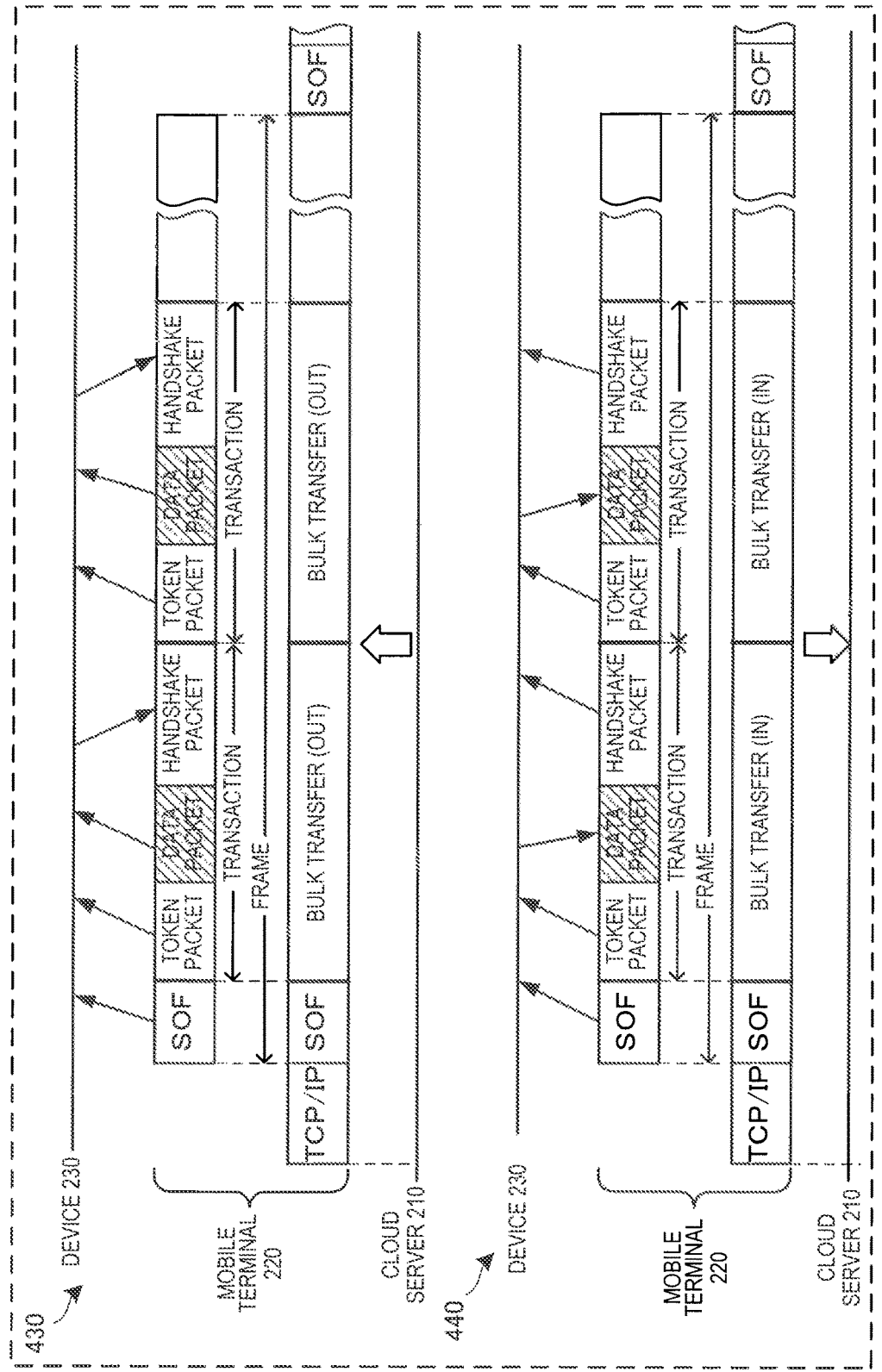
FIG. 4C is a view showing the procedure of data input/output according to the second embodiment of the present invention.

FIG. 4C is a view showing the procedure of data input/output according to this embodiment. The upper stage of FIG. 4C shows the procedure of data output to the device 230, and the lower stage of FIG. 4C shows the procedure of data input from the device 230.

In data output to the device 230, first, IP-encapsulated output data is transmitted from the cloud server 210 to the mobile terminal 220. Next, the mobile terminal 220 transfers data acquired by decapsulating to the device 230 by bulk transfer (OUT). Each bulk transfer (OUT) is formed from a token packet, a data packet, and a handshake packet.

In data input from the device 230, first, the mobile terminal 220 acquires input data from the device 230 by bulk transfer (IN). Each bulk transfer (IN) is formed from a token packet, a data packet, and a handshake packet. Next, IP-encapsulated input data is transmitted from the mobile terminal 220 to the cloud server 210.

Figure 4D:
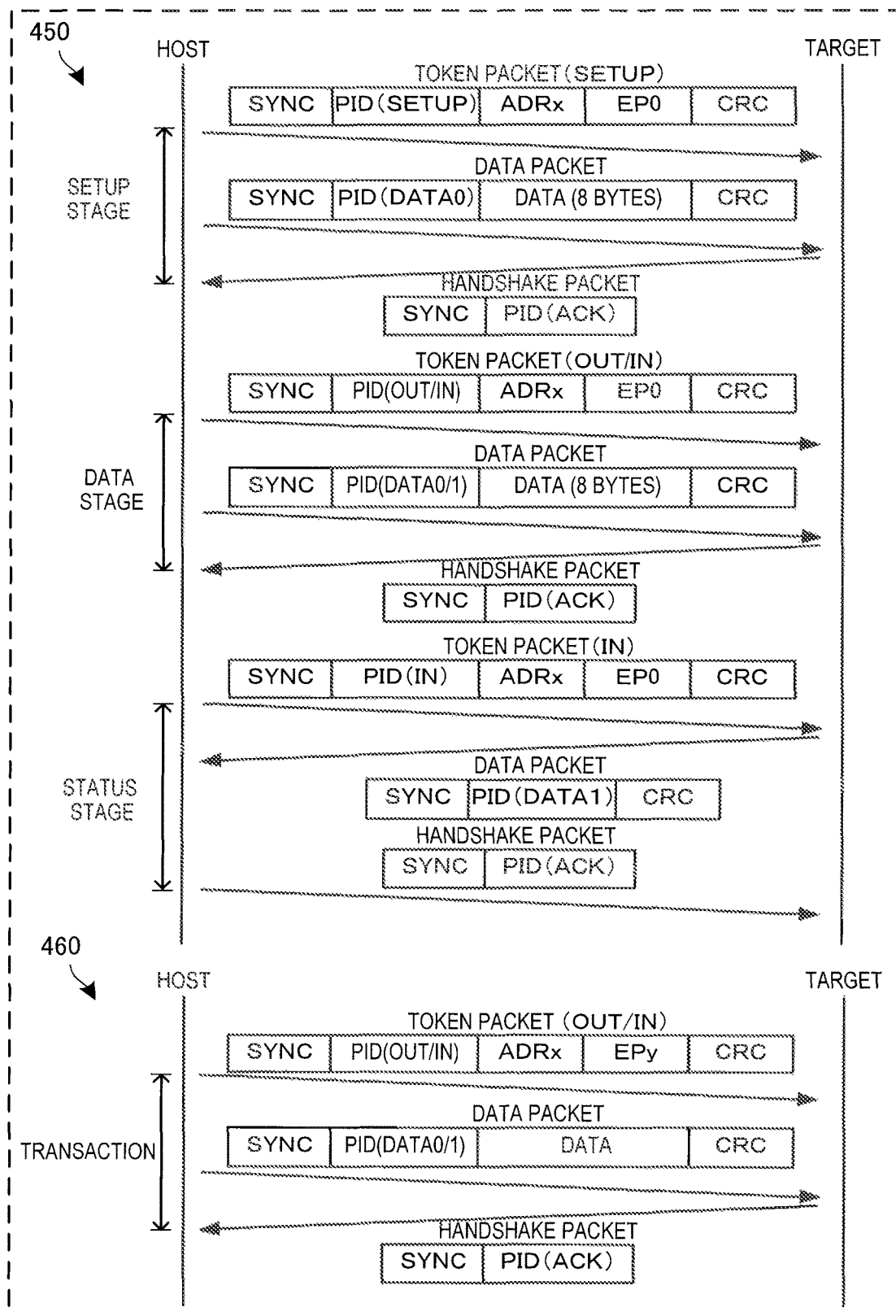
FIG. 4D is a view showing a USB protocol according to the second embodiment of the present invention.

FIG. 4D is a view showing a USB protocol according to this embodiment. FIG. 4D is a view showing the arrangements of the packets shown in FIGS. 4B and 4C.

The upper stage of FIG. 4D shows the protocol of control transfer. The lower stage of FIG. 4D shows the protocol of bulk transfer. Note that only data transmission from the host (mobile terminal) to the target (device) is shown in the data stage of control transfer and the transaction of bulk transfer. However, this also applies to data transmission from the target (device) to the host (mobile terminal).

SYNC represents a synchronization bit; PID, a packet type; ADRx, a device address; EP, an endpoint; and CRC, a correction bit. In addition, EP0 represents endpoint 0 to store descriptors; and EPy, endpoints 1 to n to store input/output data.

<<Functional Arrangement of Cloud Server>>

Figure 5:
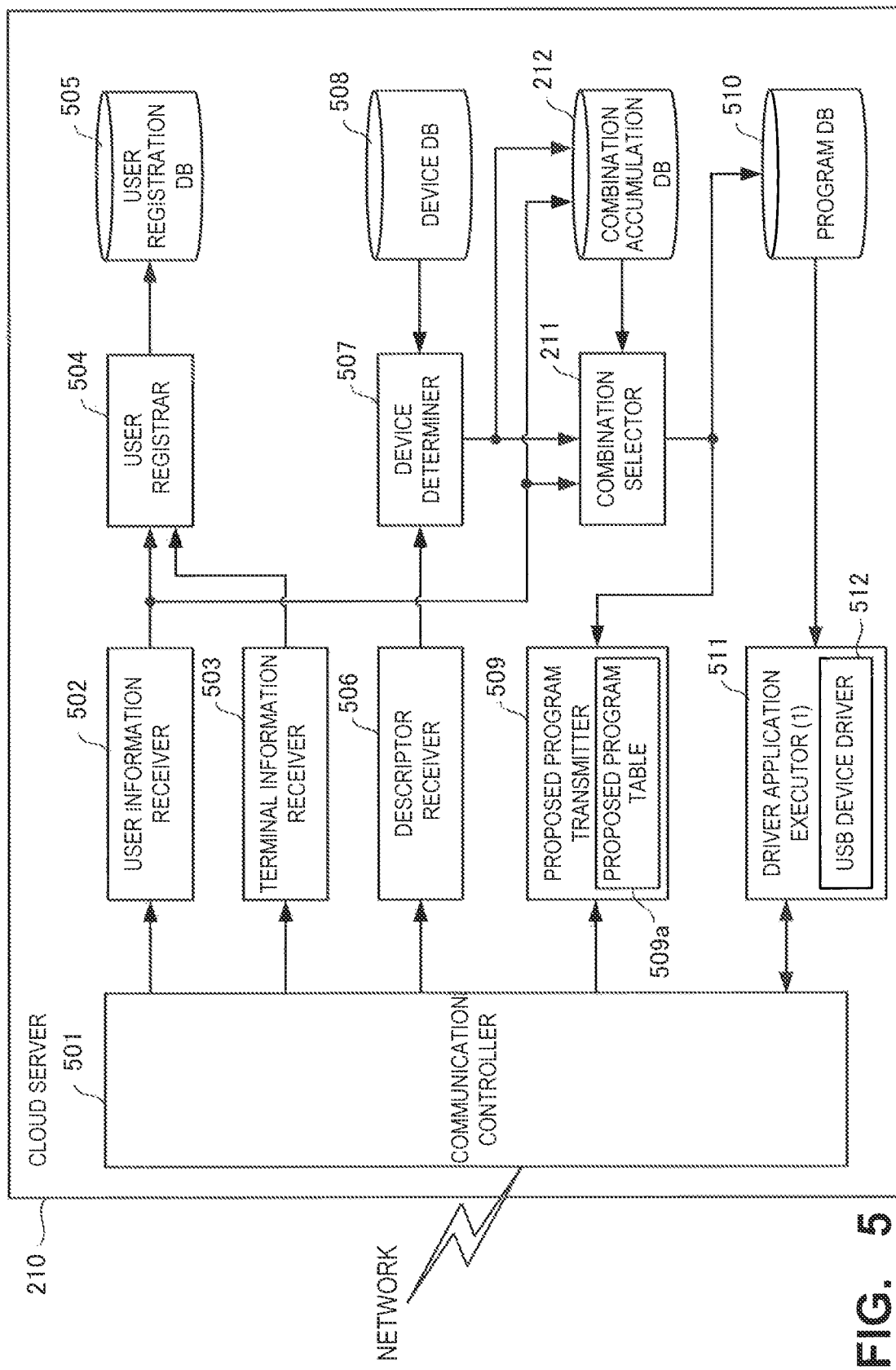
FIG. 5 is a block diagram showing the functional arrangement of a cloud server according to the second embodiment of the present invention.

FIG. 5 is a block diagram showing the functional arrangement of the cloud server 210 according to this embodiment.

The cloud server 210 includes a communication controller 501 that communicates with the mobile terminal 220 or 240 via the network 330. A user information receiver 502 receives user information such as a user ID and authentication information from a message that the communication controller 501 has received from the mobile terminal 220 or 240. A terminal information receiver 503 receives terminal information such as a mobile terminal ID and authentication information. Based on the user information and the terminal information, a user registrar 504 registers the user in a user registration DB 505 (see FIG. 7).

A descriptor receiver 506 receives descriptors acquired from the device 230 connected to the mobile terminal 220. A device determiner 507 determines the connected device 230 by referring to a device DB 508 (see FIG. 8) from the received descriptors of the device 230. The combination selector 211 selects an appropriate program based on the combination accumulation DB 212 (see FIGS. 10 and 11) in correspondence with the received user information and the determined device.

The program selected by the combination selector 211 is stored in a proposed program table 509a (see FIG. 13) held by a proposed program transmitter 509 and transmitted to the mobile terminal 220 or 240. On the other hand, the program selected by the combination selector 211 is searched from a program DB 510 (see FIG. 9) and executed by a driver application executor (1) 511 in cooperation with a driver application executor (2) 603 of the mobile terminal 220. The driver application executor (1) 511 also executes a USB device driver 512.

<<Functional Arrangement of Mobile Terminal>>

Figure 6:
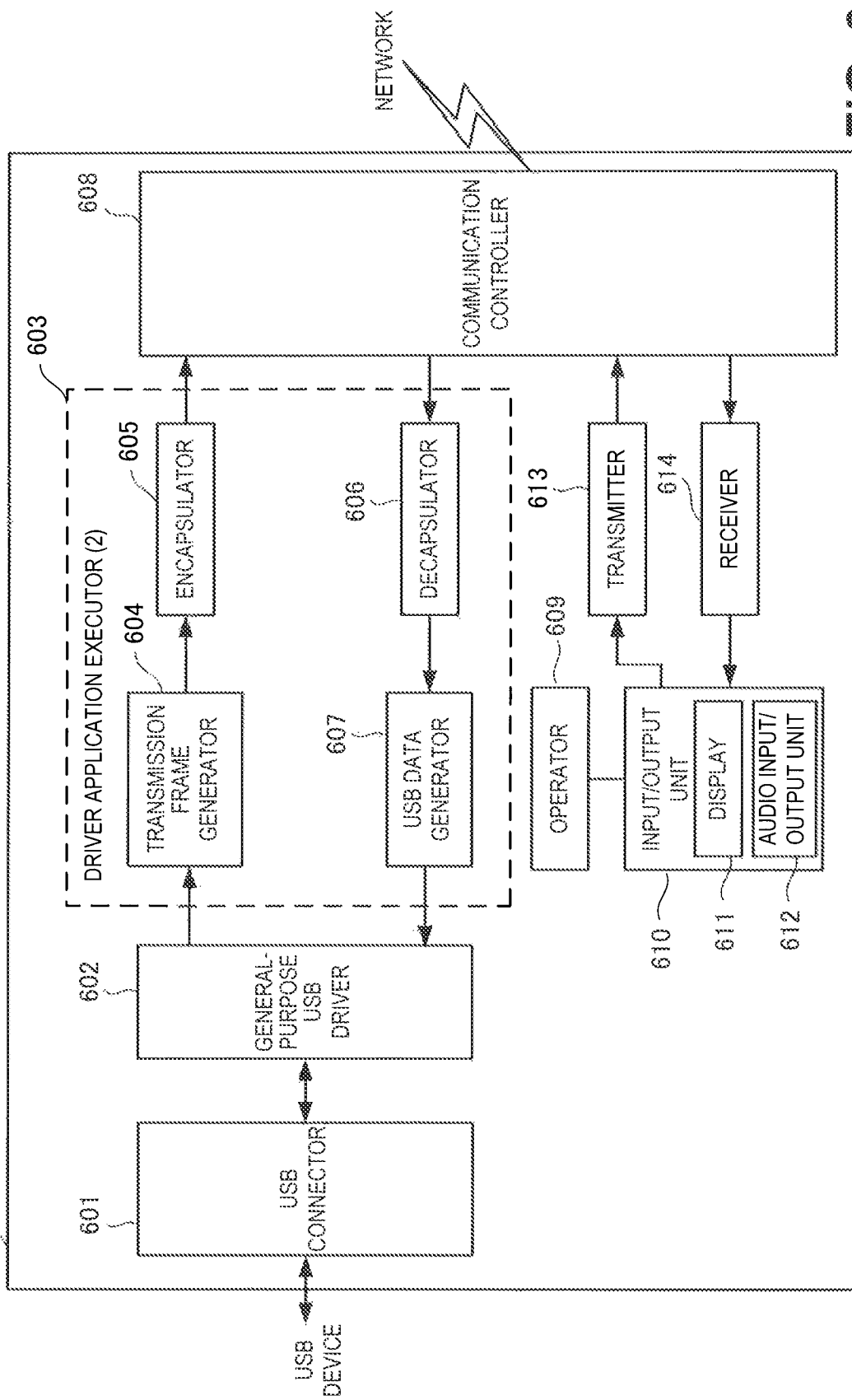
FIG. 6 is a block diagram showing the functional arrangement of a mobile terminal according to the second embodiment of the present invention.

FIG. 6 is a block diagram showing the functional arrangement of the mobile terminals 220, 240, and 311 to 313 according to this embodiment. Since all mobile terminals have the same arrangement, the mobile terminal 220 will be representative of them in the following description.

The mobile terminal 220 according to this embodiment includes a USB connector 601 used to connect a USB device. The mobile terminal 220 also includes a general-purpose A USB driver 602 configured to acquire the descriptors of the device connected to the USB connector 601. The mobile terminal 220 also includes the driver application executor (2) 603 to IP-encapsulate data input/output from/to the USB device and transmit/receive it to/from the cloud server 210. The driver application executor (2) 603 exchanges data between the cloud server 210 and the device 230 via the mobile terminal 220 in cooperation with the driver application executor (1) 511 of the cloud server 210. The driver application executor (2) 603 includes a transmission frame generator 604 and an encapsulator 605 which are configured to transmit a packet of data acquired from the device 230 to the IP network. The driver application executor (2) 603 also includes a decapsulator 606 and a USB data generator 607 which are configured to output data from a packet received from the IP network to the device 230. The mobile terminal 220 further includes a communication controller 608 that controls communication with the cloud server 210 via the network.

The mobile terminal 220 also includes a transmitter 613 which transmits data different from that of the USB device via the communication controller 608, and a receiver 614. The mobile terminal 220 also includes an operator 609 formed from a touch panel, a keyboard, and the like, and an input/output unit 610. The input/output unit 610 includes a display 611 that displays data received by the receiver 514, and an audio input/output unit 612 that inputs/outputs an audio.

(User Registration DB)

FIG. 7 is a view showing the arrangement of the user registration DB 505 according to this embodiment. Note that the user registration DB 505 is not limited to the arrangement shown in FIG. 7.

The user registration DB 505 stores a mobile terminal ID 702, a model 703 of the mobile terminal, communication performance 704, a device connector 705 held by the mobile terminal, an installed device driver 706, an audio communication method 707, a data communication method 708, and the like in association with a user ID 701.

(Device DB)

Figure 8:
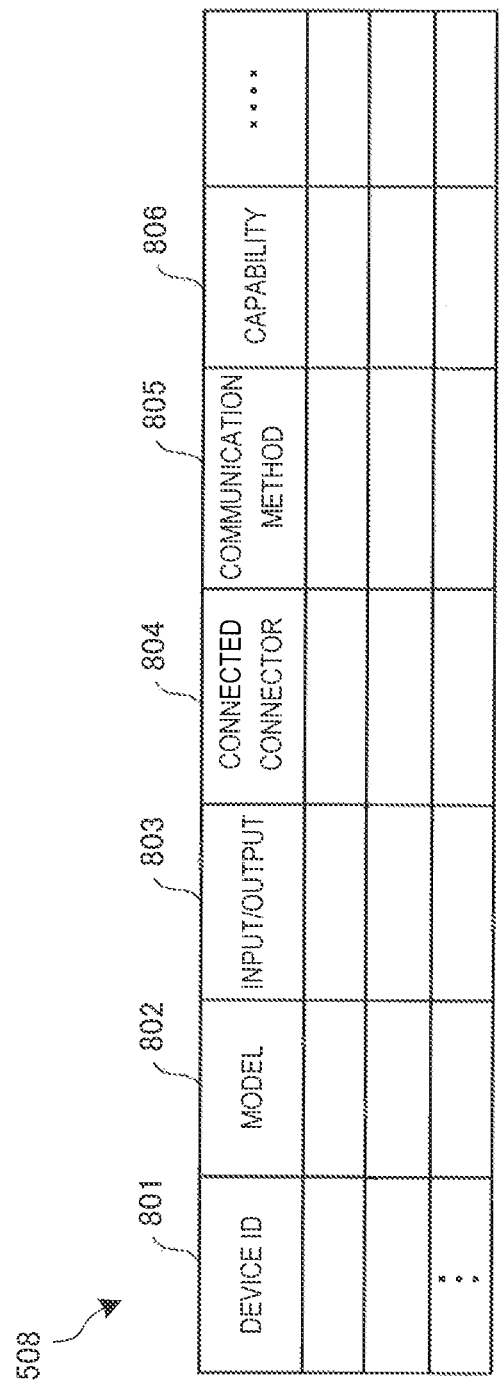
FIG. 8 is a view showing the arrangement of a device DB according to the second embodiment of the present invention.

FIG. 8 is a view showing the arrangement of the device DB 508 according to this embodiment. Note that the device DB 508 is not limited to the arrangement shown in FIG. 8.

The device DB 508 stores a device model 802, a type 803 indicating an input device or an output device, a connected connector 804 held by the device, a communication method 805, a device capability 806, and the like in association with a device ID 801. Since the connected connector 804 corresponds to the communication method 805, only one of them may be stored.

(Program DB)

FIG. 9 is a view showing the arrangement of the program DB 510 according to this embodiment. Note that the program DB 510 is not limited to the arrangement shown in FIG. 9.

The program DB 510 stores a device driver, a driver application, and a data processing application as program types 901. Program IDs 902 of a plurality of programs are stored for each program type 901. A communication terminal 903 of a communication partner via the IP network, a communication method 904, a connected connector 905 held by the communication terminal 903, a connected device 906, a capability 907 thereof, and the like are stored in association with each program ID 902. Program candidates capable of operating the connected device are searched for based on the program DB 510.

(Combination Accumulation DB)

FIGS. 10 and 11 are views showing the arrangement of the combination accumulation DB 212 according to this embodiment. Note that the combination accumulation DB 212 is not limited to the arrangement shown in FIGS. 10 and 11.

FIG. 10 is a view showing an arrangement 1010 that accumulates combinations for each user out of the combination accumulation DB 212.

The arrangement 1010 stores a device 1013 that has been connected once in association with a user ID 1011 and a mobile terminal 1012 held by the user. A program combination of a used driver 1014 and a used application 1015 which have been used so far is stored in association with each connected device 1013. Note that the program combination may include a data processing application and other associated programs. A use count 1016, a total satisfaction level 1017 that accumulates the satisfaction levels of the respective use times, and an average satisfaction level 1018 obtained by dividing the total satisfaction level 1017 by the count, which serve as evaluation indices, are stored in association with the program combination. Note that the evaluation indices are not limited to those. Another index 1019 is also stored.

FIG. 11 is a view showing an arrangement 1120 that accumulates combinations for all users out of the combination accumulation DB 212.

The arrangement 1120 stores a connected connector 1122 in association with a mobile terminal 1121. The arrangement 1120 also stores a connected device 1123 that has been connected once in association with each connected connector 1122. Items from a used driver 1124 to an average satisfaction level 1128 are the same as those from the used driver 1014 to the average satisfaction level 1018 in FIG. 10 except that the evaluation indices are defined by all users. In addition, a maximum/minimum satisfaction level 1129 out of the satisfaction levels of all users is stored. Note that the evaluation indices are not limited to those. Another index is also stored.

<<Hardware Arrangement of Cloud Server>>

Figure 12:
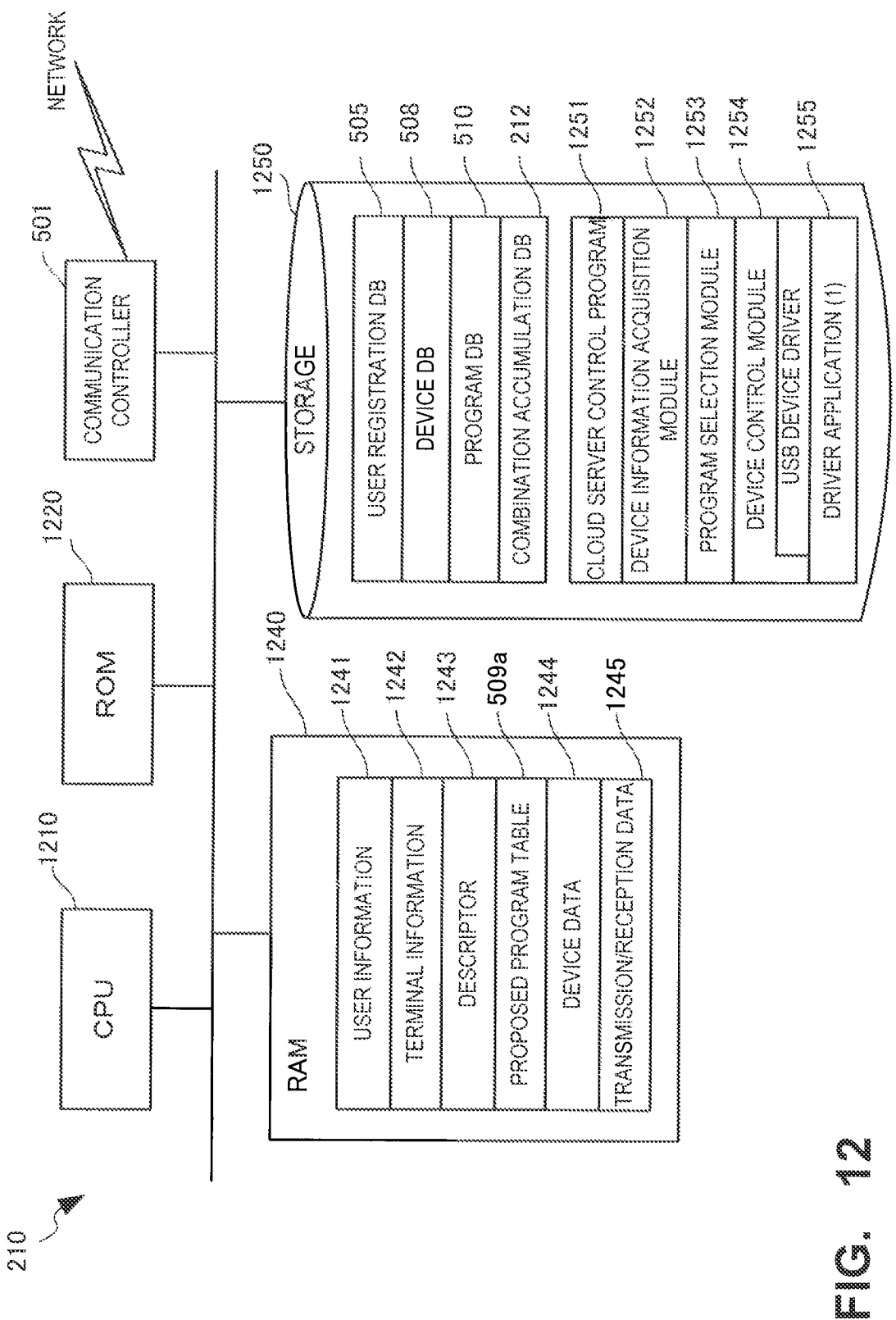
FIG. 12 is a block diagram showing the hardware arrangement of the cloud server according to the second embodiment of the present invention.

FIG. 12 is a block diagram showing the hardware arrangement of the cloud server 210 according to this embodiment.

Referring to FIG. 12, a CPU 1210 is a processor for arithmetic control, and implements each functional component of the cloud server 210 shown in FIG. 5 by executing a program. A ROM 1220 stores initial data, permanent data of programs and the like, and programs. The communication controller 501 is a communication controller, and in this embodiment, communicates with the mobile terminals 220, 240, and 311 to 313 via the network 330. Note that the number of CPUs 1210 is not limited to one, and the CPU 1210 may include a plurality of CPUs or a GPU (Graphics Processing Unit) for image processing.

A RAM 1240 is a random access memory used by the CPU 1210 as a work area for temporary storage. An area to store data necessary for implementation of the embodiment is allocated to the RAM 1240. User information 1241 includes the identifier and authentication information of the user under communication. Terminal information 1242 includes the identifier and authentication information of the mobile terminal under communication. A descriptor 1243 is device information that the mobile terminal has acquired from the device connected to it and transmitted to the cloud server 210. A proposed program table 509a is a table that selects and stores a program appropriate for operating the connected device so as to propose the program to the user from the cloud server 210 via the mobile terminal (see FIG. 13). Device data 1244 is data to be input/output from/to the device. A transmission/reception message 1245 is a message to be transmitted/received to/from the mobile terminal via the communication controller 501.

A storage 1250 stores databases, various kinds of parameters, and following data and programs necessary for implementation of the embodiment. The user registration DB 505 is the database shown in FIG. 7. The device DB 508 is the database shown in FIG. 8. The program DB 510 is the database shown in FIG. 9. The combination accumulation DB 212 is the database shown in FIGS. 10 and 11.

The storage 1250 stores the following programs. A cloud server control program 1251 is a program that controls the entire cloud server 210. A device information acquisition module 1252 is a module that acquires the information of the device connected to the mobile terminal in the cloud server control program 1251. A program selection module 1253 is a module that selects an appropriate program to operate the connected device by referring to the combination accumulation DB 212 in the cloud server control program 1251 (see FIG. 14). A device control module 1254 is a module that controls the connected device in the cloud server control program 1251. The device control module 1254 includes a USB device driver. A driver application (1) 1255 is a program configured to connect the cloud server 210, the mobile terminal 220, and the device 230 in cooperation with a driver application (2) 1656 of the mobile terminal.

Note that FIG. 12 shows data and programs associated with this embodiment but not general-purpose data and programs in the cloud server.

(Proposed Program Table)

FIG. 13 is a view showing the arrangement of the proposed program table 509a according to this embodiment.

The proposed program table 509a stores a connected device 1303 connected to the mobile terminal in association with a mobile terminal ID 1301 and a user ID 1302. The proposed program table 509a also stores a combination of a device driver and a driver application selected by the program selection module 1253 in association with each connected device 1303. The combination of the device driver and the driver application includes a user taste combination 1304 based on the satisfaction level of each user, and a device server recommended combination 1305 considering the satisfaction levels of all users.

Note that the proposed program table 509a may include a data processing application. A program combination appropriate for another index, for example, a device use environment may be selected. As the use environment, for example, whether to focus the speed or quality may be included.

<<Processing Procedure of Cloud Server>>

Figure 14:
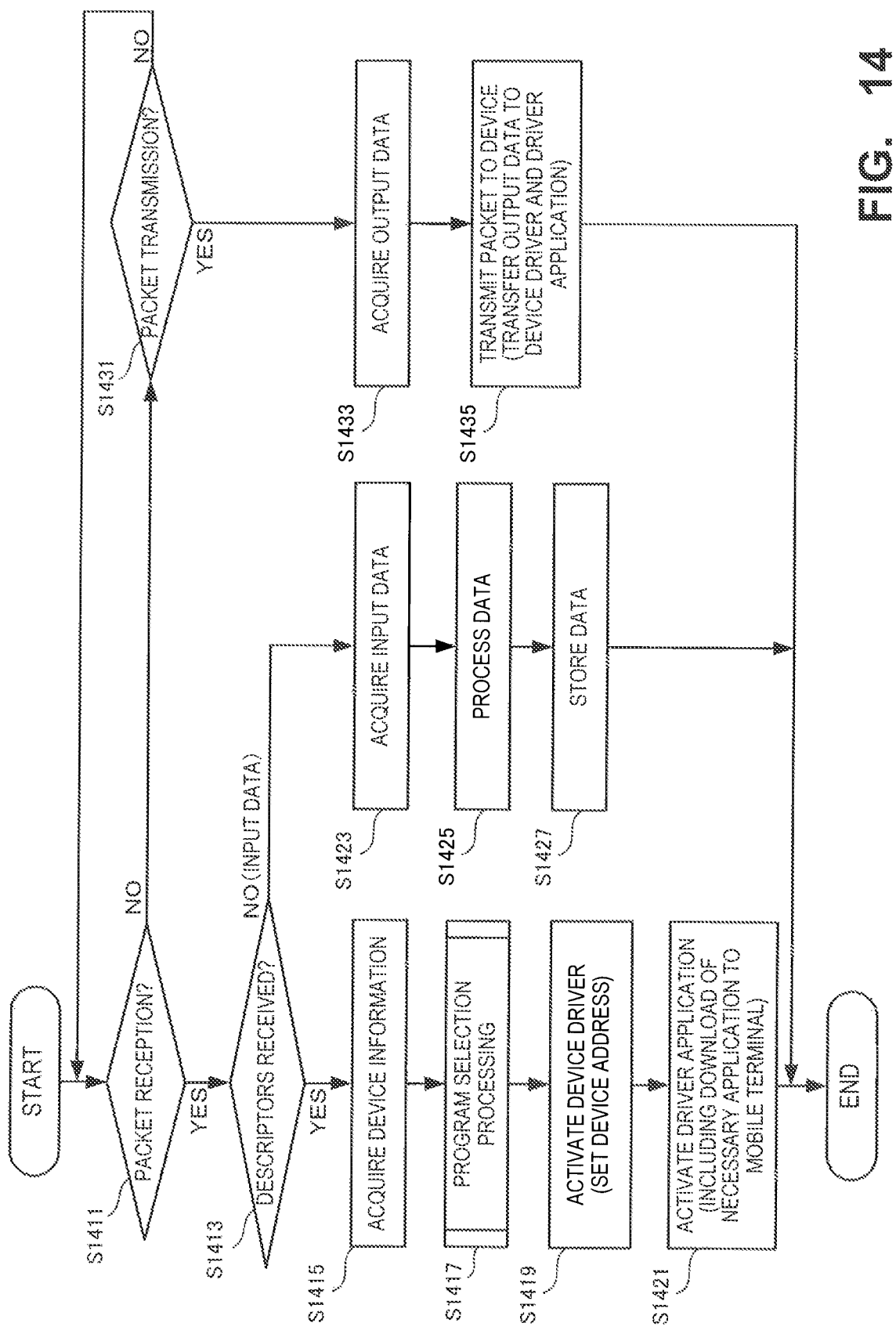
FIG. 14 is a flowchart showing the processing procedure of the cloud server according to the second embodiment of the present invention.

FIG. 14 is a flowchart showing the processing procedure of the cloud server 210 according to this embodiment. This flowchart is executed by the CPU 1210 shown in FIG. 12 using the RAM 1240 and implements the functional components shown in FIG. 5. Note that the flowchart of FIG. 14 starts in accordance with occurrence of an event such as packet transmission/reception or descriptor reception in the cloud server 210.

First, in step S1411, the cloud server 210 determines whether a packet is received. Additionally, in step S1431, the cloud server 210 determines whether to transmit a packet. When a packet is received, the cloud server 210 advances to step S1413, decapsulates the packet, and determines whether the descriptors of the connected device are received. If no descriptors are received, the cloud server 210 determines that input data is received.

If descriptors are received, the cloud server 210 advances to step S1415 and acquires the device information of the connected device from the descriptors. In step S1417, the cloud server 210 selects, by referring to the combination accumulation DB 212 from the device information, a program that appropriately operates the device (see FIG. 15). In step S1419, the cloud server 210 activates the selected device driver. Note that a device address by the cloud server 210 is set for the device. In step S1421, the cloud server 210 activates the driver application. The cloud server 210 downloads an application corresponding to the mobile terminal 220 as needed.

If input data is received, the cloud server 210 advances to step S1423 and acquires the input data. In step S1525, the cloud server 210 processes the data as needed. Note that the cloud server 210 may select a data processing application as well in step S1417. In step S1427, the cloud server 210 stores the input data from the device.

On the other hand, to transmit a packet to the device, the cloud server 210 advances to step S1433 and acquires output data. In step S1435, the cloud server 210 outputs the encapsulated output data to the device. That is, the cloud server 210 transfers the output data to the device driver and the driver application.

(Program Selection Processing)

Figure 15:
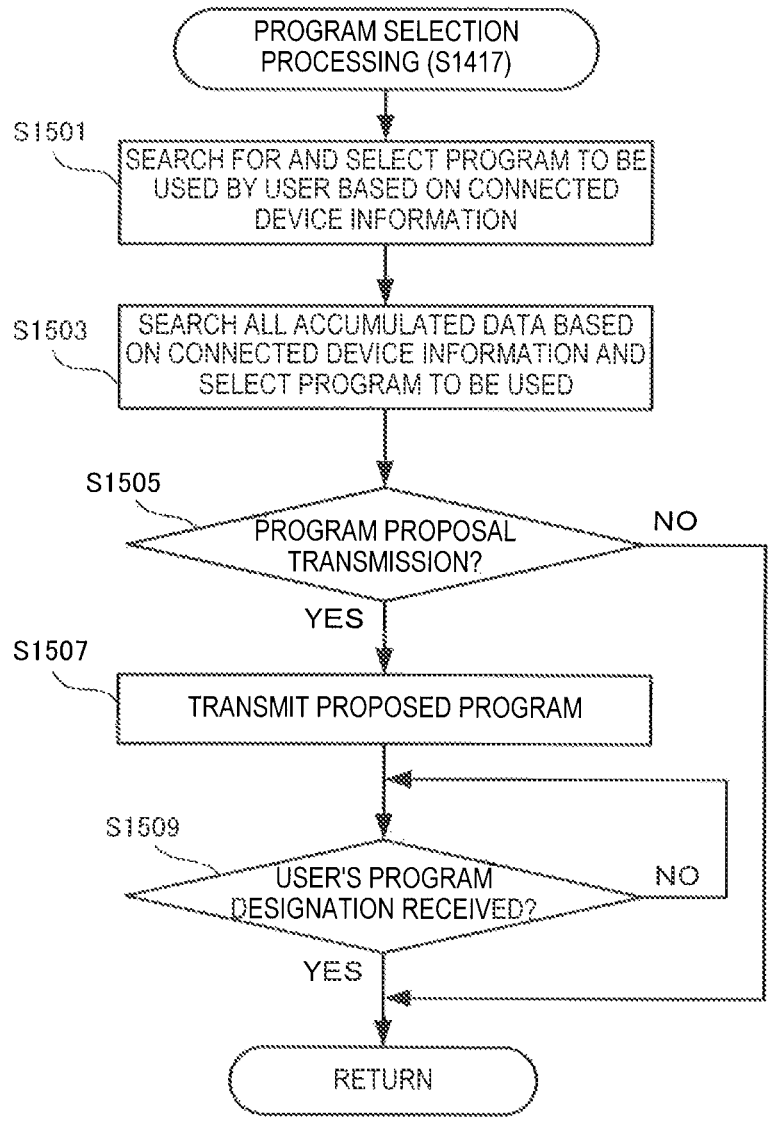
FIG. 15 is a flowchart showing the processing procedure of program selection processing according to the second embodiment of the present invention.

FIG. 15 is a flowchart showing the processing procedure of program selection processing S1417 according to this embodiment.

First, in step S1501, the cloud server 210 searches the history in the combination accumulation DB 212 for programs used by the user based on connected device information, and selects appropriate programs of high satisfaction levels. In step S1503, the cloud server 210 searches the history in the combination accumulation DB 212 for accumulated data of all users based on the connected device information, and selects appropriate programs of high satisfaction levels.

In step S1505, the cloud server 210 determines whether to propose the programs to the user and query the designation of the user. To query the user, the cloud server 210 advances to step S1507 and transmits the selected programs of high satisfaction levels to the mobile terminal designated by the user. In step S1509, the cloud server 210 waits for a program designation by the user and returns upon receiving the program designation. Not to query the user, the cloud server 210 directly returns and executes a program.

Note that the "determining whether to propose the programs to the user and querying the designation of the user" of the cloud server 210 in step S1505 is performed in the following way. For example, at the time of user registration or the like, the cloud server 210 may set whether to query the user or execute a program without query and register the setting in a table in advance. This setting may be done not for each user but more finely for each program group or each program. The device information from the mobile terminal 220 to the cloud server 210 may include information representing whether a user designation is necessary. In this case, the information may be set by the user every time a device is connected, or registered in the mobile terminal 220 in advance. This registration information may also be set not for each user but more finely for each program group or each program.

Note that if there is no "designation of the mobile terminal serving as the program display transmission designation by the user" in step S1507, the cloud server 210 performs the program display on the mobile terminal 220 connected to the device. As for "designation of the mobile terminal serving as the program display transmission designation by the user", for example, in FIG. 2, the user may perform the program display from the mobile terminal 220 to the mobile terminal 240 in advance, and the setting may be stored in the cloud server 210. The user may designate, from the mobile terminal 220, transfer of the program display to the mobile terminal 240. Alternatively, if the user himself/herself or another user wants to see the selected programs on another mobile terminal, the another mobile terminal that the user has accessed is designated as the transmission destination. If the device connection is done by an application using a connected device or connected device group in advance, a table used to designate the mobile terminal as the transmission destination preset in the cloud server 210 may be held and referred to.

<<Hardware Arrangement of Mobile Terminal>>

Figure 16:
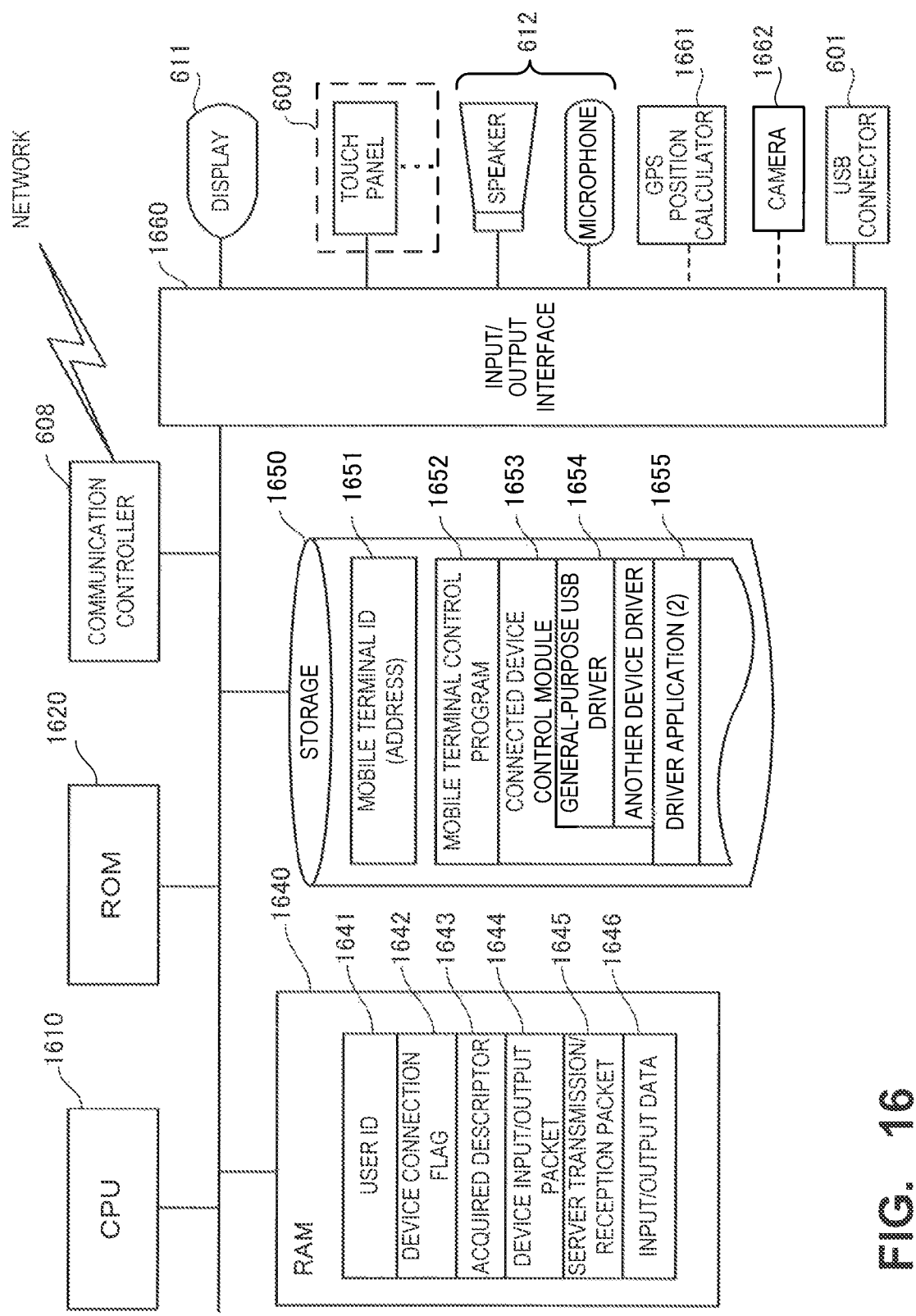
FIG. 16 is a block diagram showing the hardware arrangement of the mobile terminal according to the second embodiment of the present invention.

FIG. 16 is a block diagram showing the hardware arrangement of the mobile terminals 220, 240, and 311 to 313 according to this embodiment. The mobile terminal 220 will be representative of the mobile terminals in the following description.

Referring to FIG. 16, a CPU 1610 is a processor for arithmetic control, and implements each functional component of the mobile terminal 220 shown in FIG. 6 by executing a program. A ROM 1620 stores initial data, permanent data of programs and the like, and programs. The communication controller 608 is a communication controller, and in this embodiment, communicates with the cloud server 210 via the network. Note that the number of CPUs 1610 is not limited to one, and the CPU 1610 may include a plurality of CPUs or a GPU for image processing.

A RAM 1640 is a random access memory used by the CPU 1610 as a work area for temporary storage. An area to store data necessary for implementation of the embodiment is allocated to the RAM 1640. A user ID 1641 includes the identifier and authentication information of the user who is using the mobile terminal. A device connection flag 1642 is a flag representing that a device is connected to the USB connector 601 of the mobile terminal. An acquired descriptor 1643 is a descriptor acquired from the connected USB device. A device input/output packet 1644 is a packet to be input/output from/to the USB device. A server transmission/reception packet 1645 is an encapsulated packet to be transmitted/received to/from the cloud server 210 via the communication controller 608. Input/output data 1646 is input/output data to be input/output via an input/output interface 1660.

A storage 1650 stores databases, various kinds of parameters, and following data and programs necessary for implementation of the embodiment. A mobile terminal ID 1651 is the identifier of the mobile terminal. The storage 1650 stores the following programs. A mobile terminal control program 1652 is a program that controls the entire mobile terminal 220. A connected device control module 1653 is a module that controls the connected device in the mobile terminal control program 1652. The connected device control module 1653 includes a general-purpose USB driver 1654. A driver application (2) 1655 connects the cloud server 210, the mobile terminal 220, and the device 230 in cooperation with the driver application (1) 1255 of the cloud server 210.

The input/output interface 1660 interfaces input/output data from/to an input/output device. The display 611 and the operator 609 formed from a touch panel and the like are connected to the input/output interface 1660. The audio input/output unit 612 such as a speaker or a microphone is also connected to the input/output interface 1660. A GPS (Global Positioning System) position generator 1661 and a camera 1662 are also connected to the input/output interface 1660. Additionally, the USB connector 601 is connected to the input/output interface 1660.

Note that FIG. 16 shows data and programs associated with this embodiment but not general-purpose data and programs in the mobile terminal.

(Processing Procedure of Mobile Terminal)

Figure 17A:
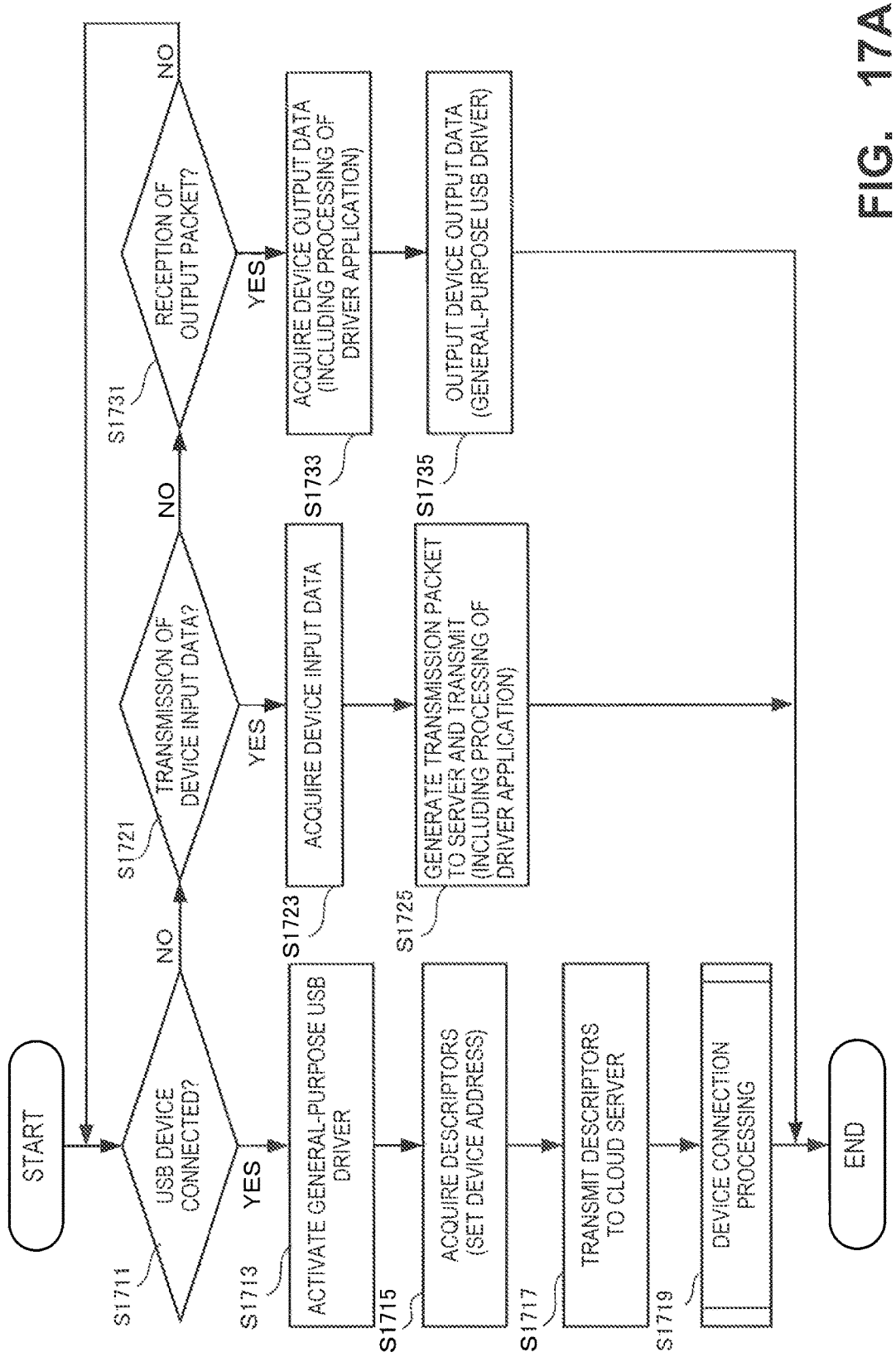
FIG. 17A is a flowchart showing the processing procedure of the mobile terminal according to the second embodiment of the present invention.

FIG. 17A is a flowchart showing the processing procedure of the mobile terminals 220, 240, and 311 to 313 according to this embodiment. This flowchart is executed by the CPU 1610 shown in FIG. 16 using the RAM 1640 and implements the functional components shown in FIG. 6. Note that the flowchart of FIG. 17A starts in accordance with occurrence of an event such as connection of a USB device to the mobile terminal, input from the device, or output to the device.

First, in step S1711, the mobile terminal determines whether a USB device is connected to the USB connector 601. Next, in step S1721, the mobile terminal determines whether to transmit input data from the device to the cloud server 210. Furthermore, in step S1731, the mobile terminal determines whether an output data packet from the cloud server 210 to the device is received.

When a USB device is connected, the mobile terminal advances to step S1713 and activates the general-purpose USB device. In step S1715, the mobile terminal sets a device address from the mobile terminal and acquires descriptors. In step S1717, the mobile terminal transmits the acquired descriptors to the cloud server 210. In step S1719, the mobile terminal performs device connection processing in accordance with processing of the cloud server 210 (see FIG. 17B).

To transmit input data to the cloud server 210, the mobile terminal advances to step S1723 and acquires input data from the device. In step S1725, the mobile terminal generates a transmission packet to the cloud server 210 by encapsulating and transmits it via the IP network. On the other hand, when an output packet is transmitted from the cloud server 210, the mobile terminal advances to step S1733 and acquires output data to the device by decapsulating. In step S1735, the mobile terminal outputs the output data encapsulated in an USB packet to the device.

(Device Connection Processing)

Figure 17B:
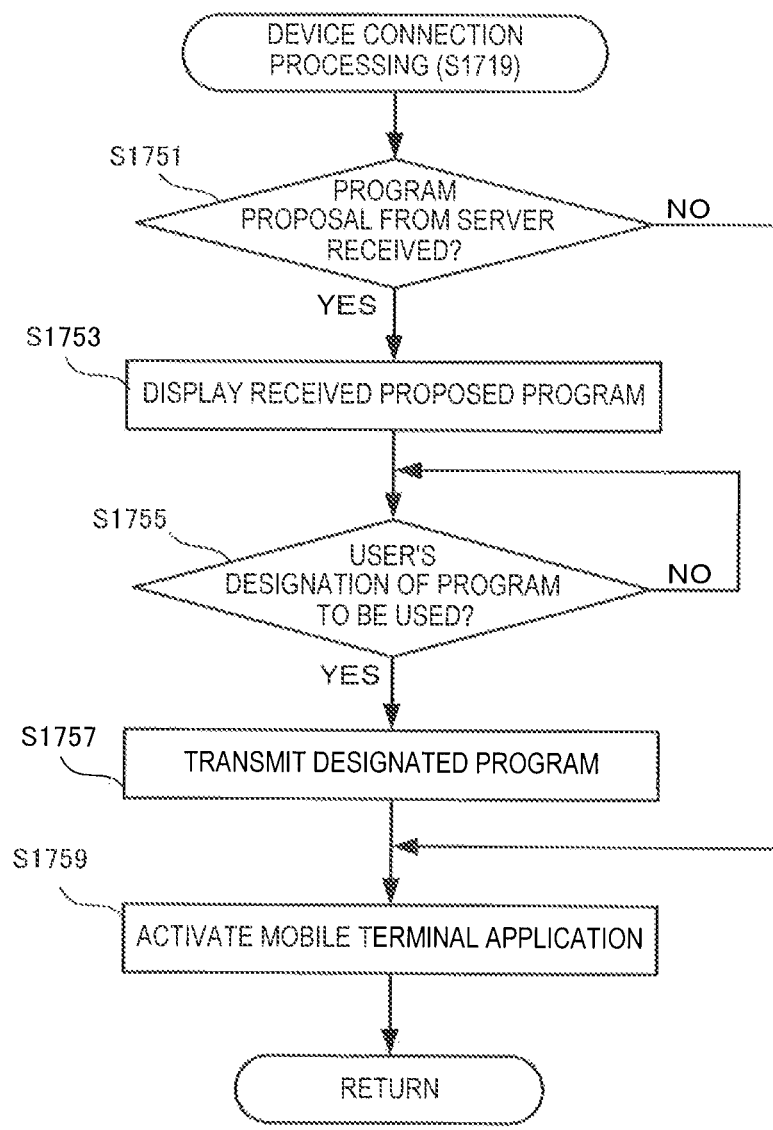
FIG. 17B is a flowchart showing the processing procedure of device connection processing according to the second embodiment of the present invention.

FIG. 17B is a flowchart showing the processing procedure of device connection processing S1719 according to this embodiment.

First, in step S1751, the mobile terminal determines whether a proposal of appropriate programs of high satisfaction levels is received from the cloud server 210. If no proposal is received, the mobile terminal advances to step S1759 and activates a mobile terminal application selected by the cloud server 210.

If a proposal is received from the cloud server 210, the mobile terminal advances to step S1753 and displays the received proposed programs. In step S1755, the mobile terminal waits for a user designation of a program to be used out of the proposed programs. When a user designation is received, the mobile terminal advances to step S1757 and transmits the designated program information to the cloud server 210. In step S1759, the mobile terminal activates the mobile terminal application.

Third Embodiment

An information processing system according to the third embodiment of the present invention will be described next. The information processing system according to this embodiment is different from the second embodiment in that when a device is connected to a mobile terminal, the mobile terminal cannot acquire device information. The rest of the components and operations is the same as in the second embodiment. Hence, the same reference numerals as in the second embodiment denote the same components and operations, and a detailed description thereof will be omitted.

According to this embodiment, control can be done for a connected device of whatever type.

<<Operation Procedure of Information Processing System>>

Figure 18:
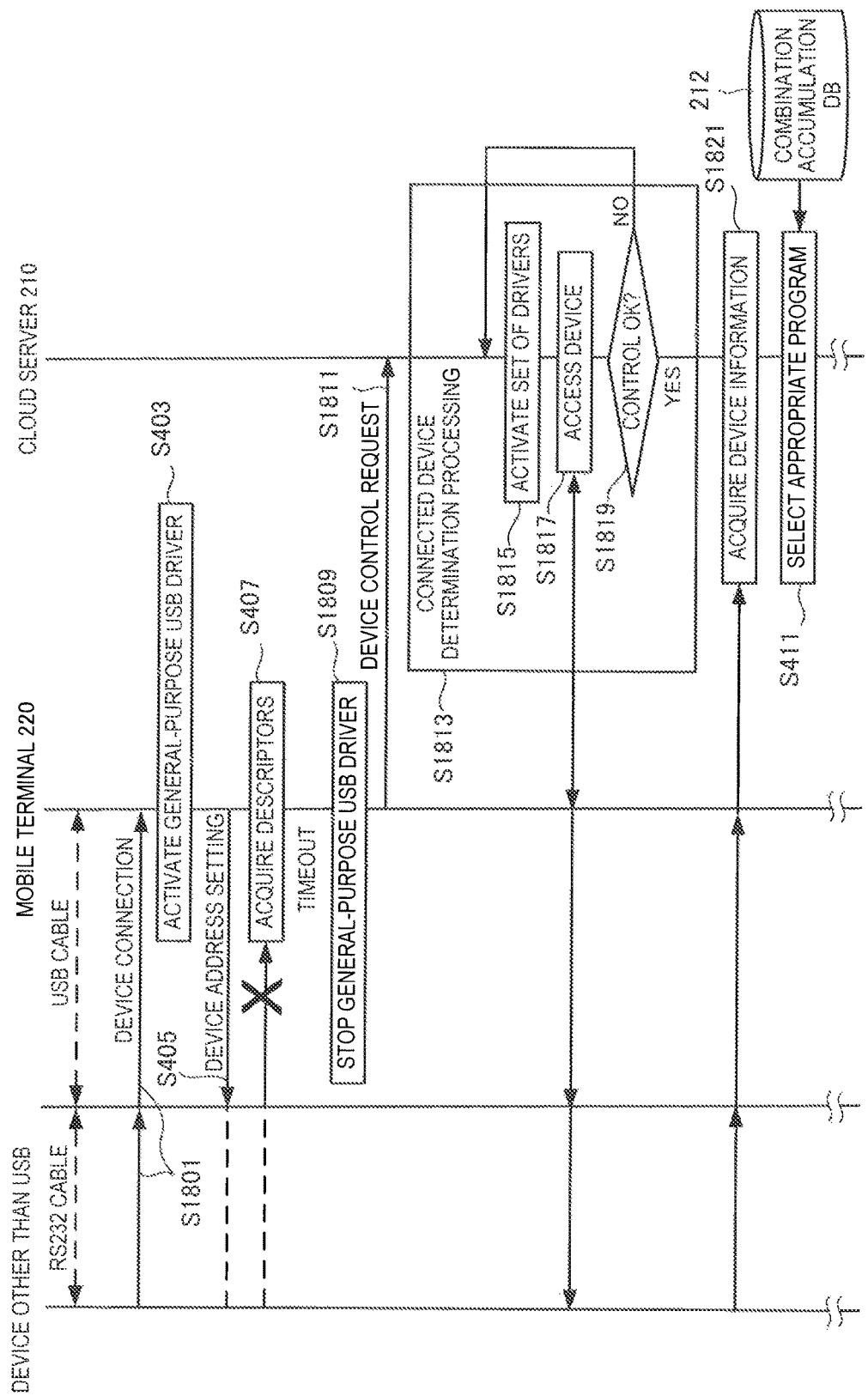
FIG. 18 is a sequence chart showing an operation procedure when a mobile terminal in an information processing system according to the third embodiment of the present invention cannot acquire device information.

FIG. 18 is a sequence chart showing an operation procedure when a mobile terminal in an information processing system 1800 according to this embodiment cannot acquire device information.

In FIG. 18, as an example in which a mobile terminal 220 cannot acquire device information, a case where a device is connected from an RS232 cable to a USB cable will be described. Assume that the mobile terminal 220 has no special driver configured to acquire, from a USB packet, the device information of a device connected to the RS232. However, the present invention is not limited to this. Note that the same step numbers as in FIG. 4A of the second embodiment denote the same steps in FIG. 18, and a description thereof will be omitted.

In step S1801, a device is connected to the mobile terminal 220 via an RS232 cable and a USB cable. From step S403, the mobile terminal 220 attempts to acquire the descriptors of the device by activating a general-purpose USB driver. However, in step S407, a timeout occurs without acquiring the descriptors.

Upon detecting the timeout, the mobile terminal 220 stops processing of the general-purpose USB driver in step S1809. In step S1811, the mobile terminal 220 requests a cloud server 210 to control the connected device.

Upon receiving the device control request, the cloud server 210 sequentially operates drivers capable of operating the connected device and determines the connected device in step S1813. More specifically, first, in step S1815, the cloud server 210 activates a set of drivers. In step S1817, the cloud server 210 accesses the device by the activated drivers. In step S1819, the cloud server 210 determines whether the device is controllable. Upon determining that the device is controllable, the cloud server 210 acquires the device information by the drivers in step S1821. The drivers include a driver that implements conversion between RS232 and USB in addition to the drivers capable of driving the device.

When the device information is acquired, the cloud server 210 selects an appropriate program including a device driver by referring to a combination accumulation DB 212 in step S411. From then on, the same processing as in FIG. 4A is performed.

Fourth Embodiment

An information processing system according to the fourth embodiment of the present invention will be described next. The information processing system according to this embodiment is different from the second embodiment in that an appropriate device setting is selected not by a program used in a cloud server but by an environmental factor at the time of use of a device based on an accumulated history. The rest of the components and operations is the same as in the second and third embodiments. Hence, the same reference numerals as in the second and third embodiments denote the same components and operations, and a detailed description thereof will be omitted.

According to this embodiment, when a device is connected to the mobile terminal, a device setting for appropriately controlling the device via a network and the mobile terminal can be selected.

<<Information Processing System>>

The arrangement and operation of the information processing system according to this embodiment will be described with reference to FIGS. 19 and 20.

(Description of Operation)

Figure 19:
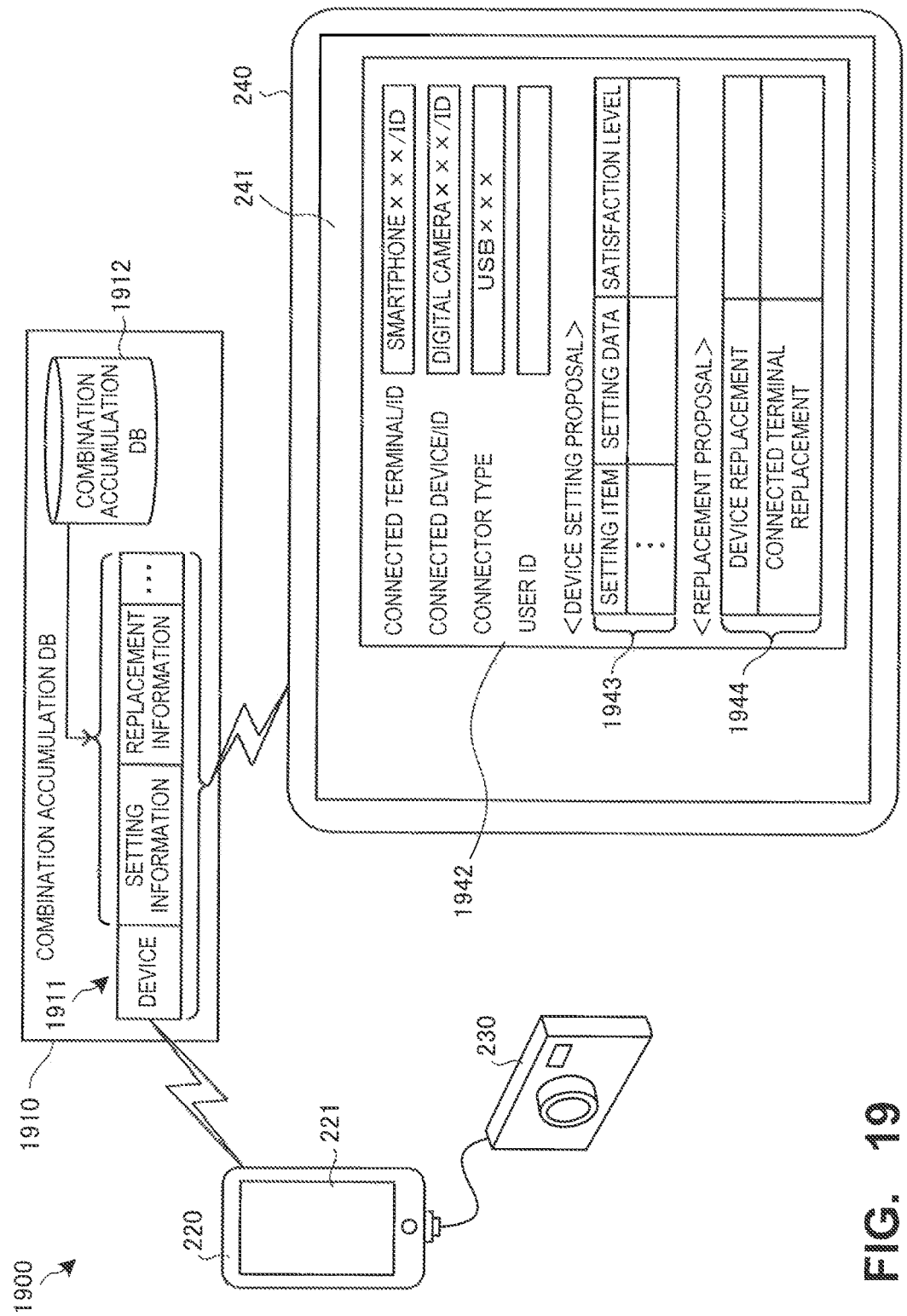
FIG. 19 is a view for explaining the operation of an information processing system according to the fourth embodiment of the present invention.

FIG. 19 is a view for explaining the operation of an information processing system 1900 according to this embodiment. Note that the same reference numerals as in FIG. 2 of the second embodiment denote the same constituent elements, and a description thereof will be omitted.

The information processing system 1900 shown in FIG. 19 includes a cloud server 1910 serving as an information processing apparatus. In the cloud server 1910, a combination selector 1911 selects setting information and replacement information for appropriately operating a device 230 connected to a mobile terminal 220 by referring to a combination accumulation DB 1912 that accumulates the history of combinations of setting information and replacement information corresponding to devices and environmental factors. Note that the setting information to be selected may automatically be set for the device 230 from the cloud server 1910, or may be displayed on a mobile terminal 240 that is a tablet, as shown in FIG. 19, and set by the user.

When the device 230 is connected to the connector (for example, USB connector) of the mobile terminal 220, the cloud server 1910 recognizes the device 230 via the mobile terminal 220. Appropriate setting data or an appropriate combination of the mobile terminal 220 and the device 230 is selected based on an environmental factor detected by the mobile terminal 220 or the device 230 based on the combination accumulation DB 1912 that accumulates the history of setting data set in the device 230 or the history of the combination of the mobile terminal 220 and the device 230. The selected appropriate setting data or appropriate combination of the mobile terminal 220 and device is proposed in a window 1942 on a display screen 241 of the mobile terminal 240. In FIG. 19, a device setting 1943 which is selected based on an environmental factor detected by the mobile terminal 220 or the device 230 and includes setting data with high level of satisfaction at the connection of the device 230 to the mobile terminal 220 in the past is proposed in the window 1942. In addition, a replacement 1944 including a replacement proposal of the device and the replacement proposal of the mobile terminal is proposed based on, for example, an accumulation of past satisfaction levels in the combination history of the mobile terminal and devices.

Note that in FIG. 19, the device setting 1943 and the replacement 1944 of the device or mobile terminal are proposed on the mobile terminal 240 different from the mobile terminal 220 connected to the device 230. However, they may be proposed on a display screen 221 of the mobile terminal 220.

(Operation Procedure)

Figure 20:
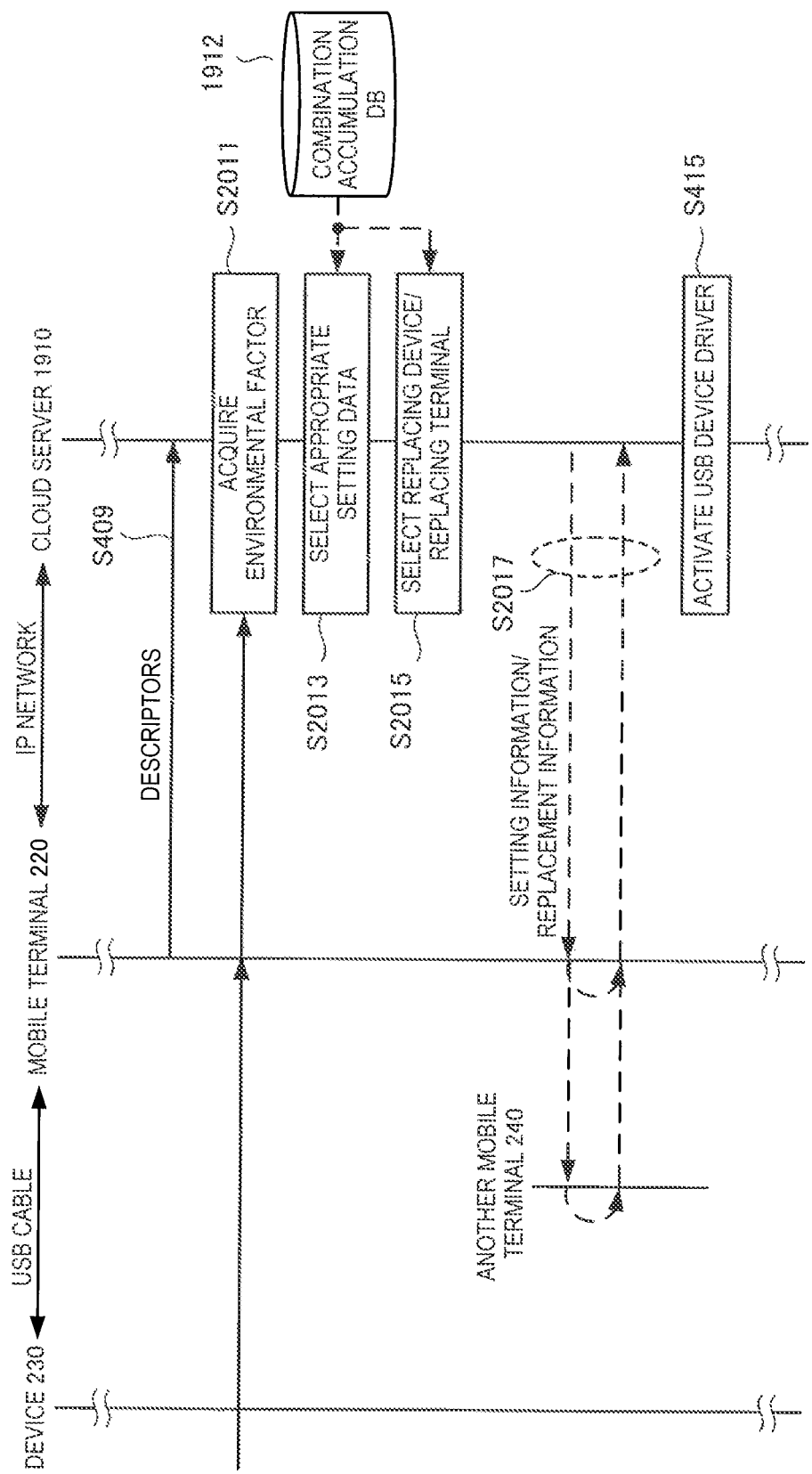
FIG. 20 is a sequence chart showing the operation procedure of the information processing system according to the fourth embodiment of the present invention.

FIG. 20 is a sequence chart showing the operation procedure of the information processing system 1900 according to this embodiment. Note that the same step numbers as in FIG. 4A of the second embodiment denote the same steps, and a description thereof will be omitted. Since the procedure up to descriptor acquisition is the same as in the second embodiment, FIG. 20 illustrates the procedure from descriptor transmission from the mobile terminal 220 to the cloud server 1910 in step S409.

In step S2011, the cloud server 1910 acquires the environmental factor detected by the device 230 and/or the mobile terminal 220. Note that the environmental factor includes weather and brightness when the device is a digital camera as in the example of FIG. 19, or temperature and humidity when the device is a printer. In step S2013, the cloud server 1910 selects appropriate setting data for the detected environmental factor based on the combination accumulation DB 1912 that accumulates the past history. In step S2015, the cloud server 1910 selects an appropriate replacing device or replacing mobile terminal for the detected environmental factor based on the combination accumulation DB 1912 that accumulates the past history.

In step S2017, the cloud server 1910 transmits a query to the mobile terminal 220 or the other mobile terminal 240 to query about the selected setting information or replacement information to do setting or replacement by the user. Note that the setting information may be set from the cloud server 1910 to the device 230 without query. The procedure from USB driver activation in step S415 is the same as in FIG. 4A and will be omitted.

<<Functional Arrangement of Cloud Server>>

Figure 21:
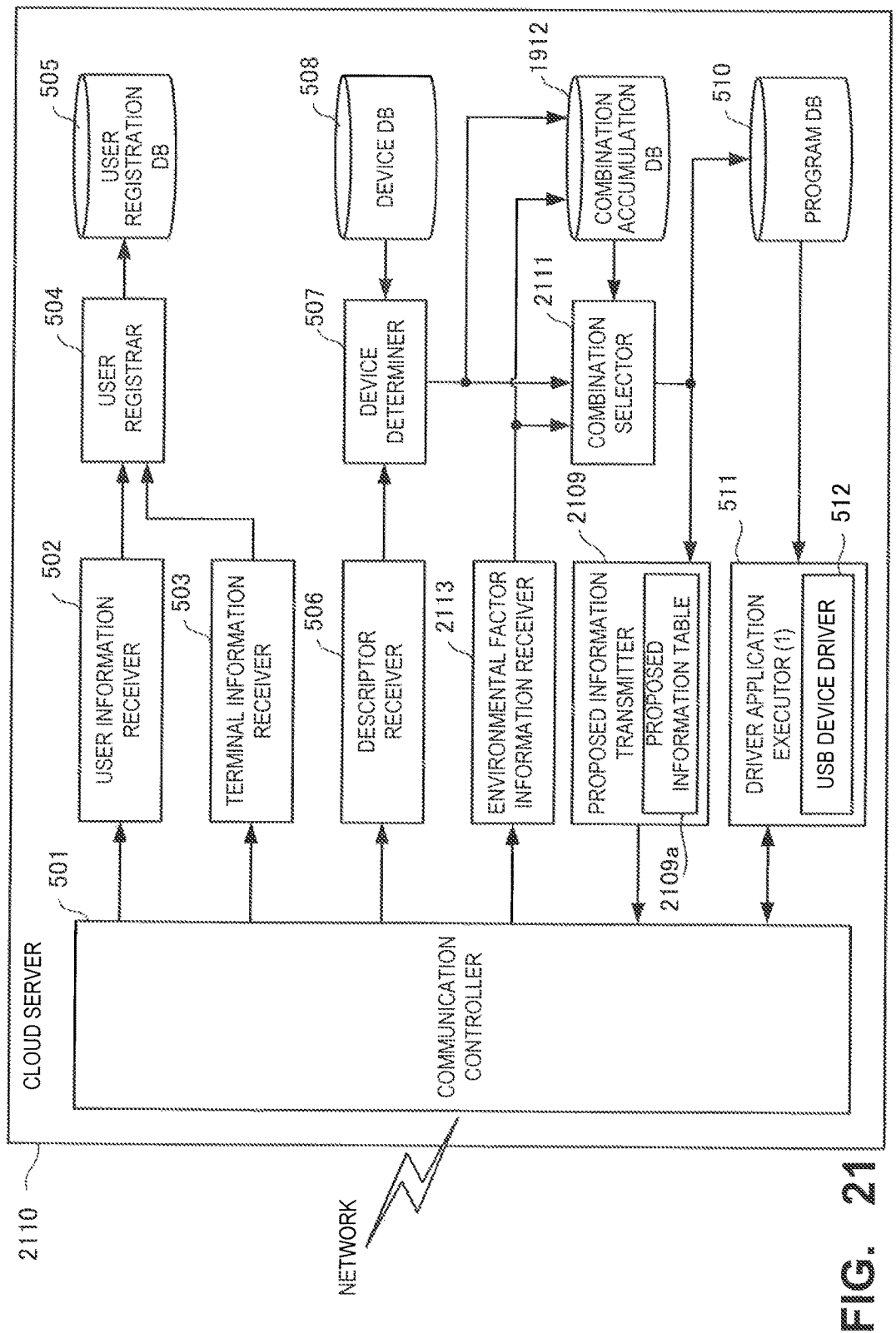
FIG. 21 is a block diagram showing the functional arrangement of a cloud server according to the fourth embodiment of the present invention.

FIG. 21 is a block diagram showing the functional arrangement of the cloud server 1910 according to this embodiment. Note that the same reference numerals as in FIG. 5 of the second embodiment denote the same functional components in FIG. 21, and a description thereof will be omitted. Connecting lines of the functional components corresponding to the processes of the second embodiment are deleted in order to avoid cumbersomeness.

An environmental factor information receiver 2113 receives environmental factor information detected by the device 230 or the mobile terminal 220 from the mobile terminal 220 via the network. A history of a device setting or a combination of a device and the mobile terminal is accumulated in the combination accumulation DB 1912 in association with the received environmental factor (see FIG. 22). A combination selector 2111 selects the setting information of the device, the replacing device, and the replacing mobile terminal in accordance with device information from a device determiner 507 and the environmental factor information from the environmental factor information receiver 2113. The pieces of selected information are transmitted from a proposed information transmitter 2109 holding a proposed information table 2109a (see FIG. 23) that stores proposed information to the mobile terminal.

(Combination Accumulation DB)

FIG. 22 is a view showing the arrangement of the combination accumulation DB 1912 according to this embodiment. Note that data shown in FIG. 22 can be accumulated in addition to the data shown in FIGS. 10 and 11.

The upper stage of FIG. 22 shows a database 2210 that accumulates the history of set values of a connected device. The database 2210 stores the history of various kinds of environmental factors 2212 and corresponding set values 2213 and satisfaction levels 2214 of the set values 2213 in association with each connected device 2211.

The lower stage of FIG. 22 shows a database 2220 that accumulates the history of combinations of connected devices and mobile terminals. The database 2220 stores the history of various kinds of device environmental factors 2222 and corresponding mobile terminals 2223 and a satisfaction level 2224 of the combinations of the connected device and the mobile terminal in association with each connected device 2221.

(Proposed Information Table)

Figure 23:
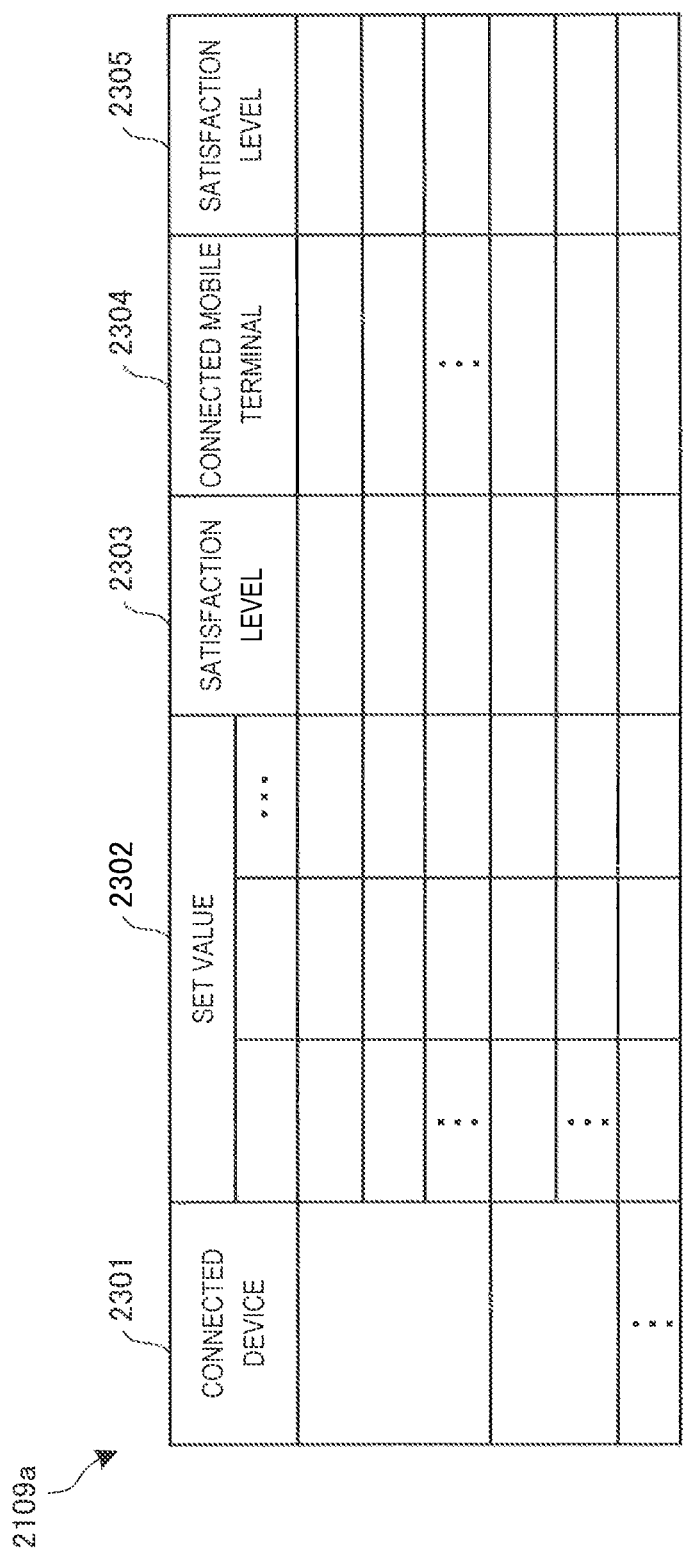
FIG. 23 is a view showing the arrangement of a proposed information table according to the fourth embodiment of the present invention.

FIG. 23 is a view showing the arrangement of the proposed information table 2109a according to this embodiment.

The proposed information table 2109a stores set values 2302 and satisfaction levels 2303 thereof and connected mobile terminals 2304 and satisfaction levels 2305 thereof in association with each connected device 2301.

<<Processing Procedure of Cloud Server>>

Figure 24:
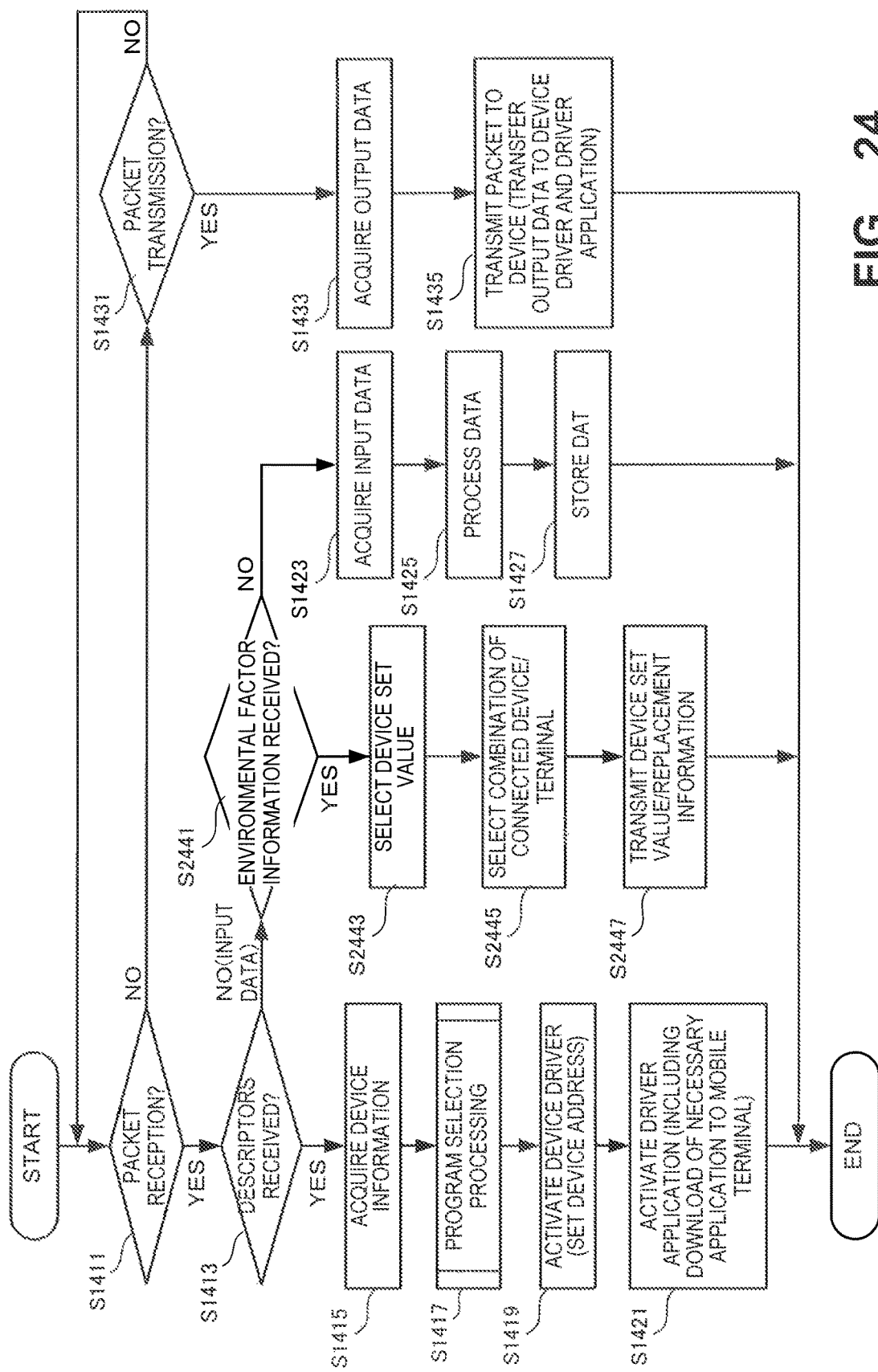
FIG. 24 is a flowchart showing the processing procedure of the cloud server according to the fourth embodiment of the present invention.

FIG. 24 is a flowchart showing the processing procedure of the cloud server 1910 according to this embodiment. This flowchart is executed by a CPU 1210 shown in FIG. 12 using a RAM 1240 and implements the functional components shown in FIG. 21. Note that the same step numbers as in FIG. 14 of the second embodiment denote the same steps, and a description thereof will be omitted.

If a packet received from the mobile terminal 220 is input data in step S2441, the cloud server 1910 determines whether the data is environmental factor information. If the data is environmental factor information, the cloud server 1910 advances to step S2443, searches the combination accumulation DB 1912 based on the environmental factor information, and selects appropriate device set values. In addition, the cloud server 1910 searches the combination accumulation DB 1912 based on the environmental factor information and selects appropriate combinations of devices and mobile terminals. In step S2447, the cloud server 1910 transmits the selected device set values or replacement information to the mobile terminal 220 or 240.

Fifth Embodiment

An information processing system according to the fifth embodiment of the present invention will be described next. The information processing system according to this embodiment is different from the second and third embodiments in that another appropriate device corresponding to a device connected to a mobile terminal is selected based on an accumulated history. The rest of the components and operations is the same as in the second to fourth embodiments. Hence, the same reference numerals as in the second to fourth embodiments denote the same components and operations, and a detailed description thereof will be omitted.

According to this embodiment, when a device is connected to the mobile terminal, another appropriate device to be connected via a network and the mobile terminal can be selected.

<<Information Processing System>>

The arrangement and operation of the information processing system according to this embodiment will be described with reference to FIGS. 25 and 26.

(Description of Operation)

Figure 25:
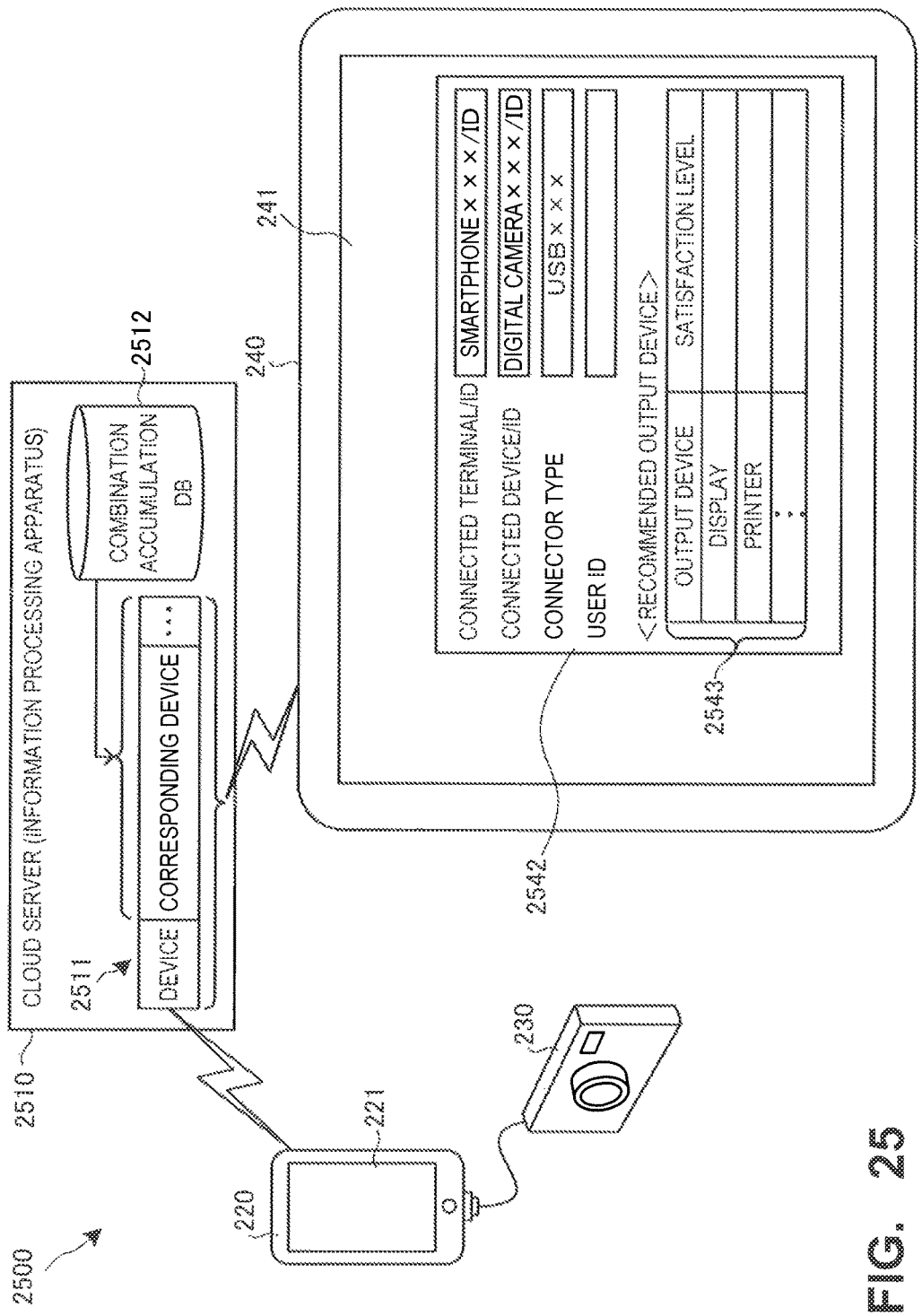
FIG. 25 is a view for explaining the operation of an information processing system according to the fifth embodiment of the present invention.

FIG. 25 is a view for explaining the operation of an information processing system 2500 according to this embodiment. Note that the same reference numerals as in FIG. 2 of the second embodiment and FIG. 19 of the fourth embodiment denote the same constituent elements, and a description thereof will be omitted.

The information processing system 2500 shown in FIG. 25 includes a cloud server 2510 serving as an information processing apparatus. In the cloud server 2510, a combination selector 2511 selects an appropriate device corresponding to a device 230 connected to a mobile terminal 220 by referring to a combination accumulation DB 2512 that accumulates the history of combinations of connected devices and associated devices. Note that in this embodiment, selection of an output device corresponding to connection of an input device to the mobile terminal 220 will be explained. However, the present invention is not limited to this. An input device corresponding to an output device, another input device corresponding to an input device, or another output device corresponding to an output device may be selected.

When the device 230 is connected to the connector (for example, USB connector) of the mobile terminal 220, the cloud server 2510 recognizes the device 230 via the mobile terminal 220. An appropriate combination of the device 230 and another device is selected based on the device 230 connected to the mobile terminal 220 and the combination accumulation DB 2512 that accumulates the history of the combination of the device 230 and a corresponding device. The selected appropriate combination of the device 230 and another device is proposed in a window 2542 on a display screen 241 of the mobile terminal 240. In FIG. 25, output devices 2543 of high satisfaction levels, which are selected in correspondence with a digital camera that is the input device connected to the mobile terminal 220, are proposed in the window 2542.

Note that in FIG. 19, the output devices 2543 are proposed on the mobile terminal 240 different from the mobile terminal 220 connected to the device 230. However, they may be proposed on a display screen 221 of the mobile terminal 220.

(Operation Procedure)

Figure 26:
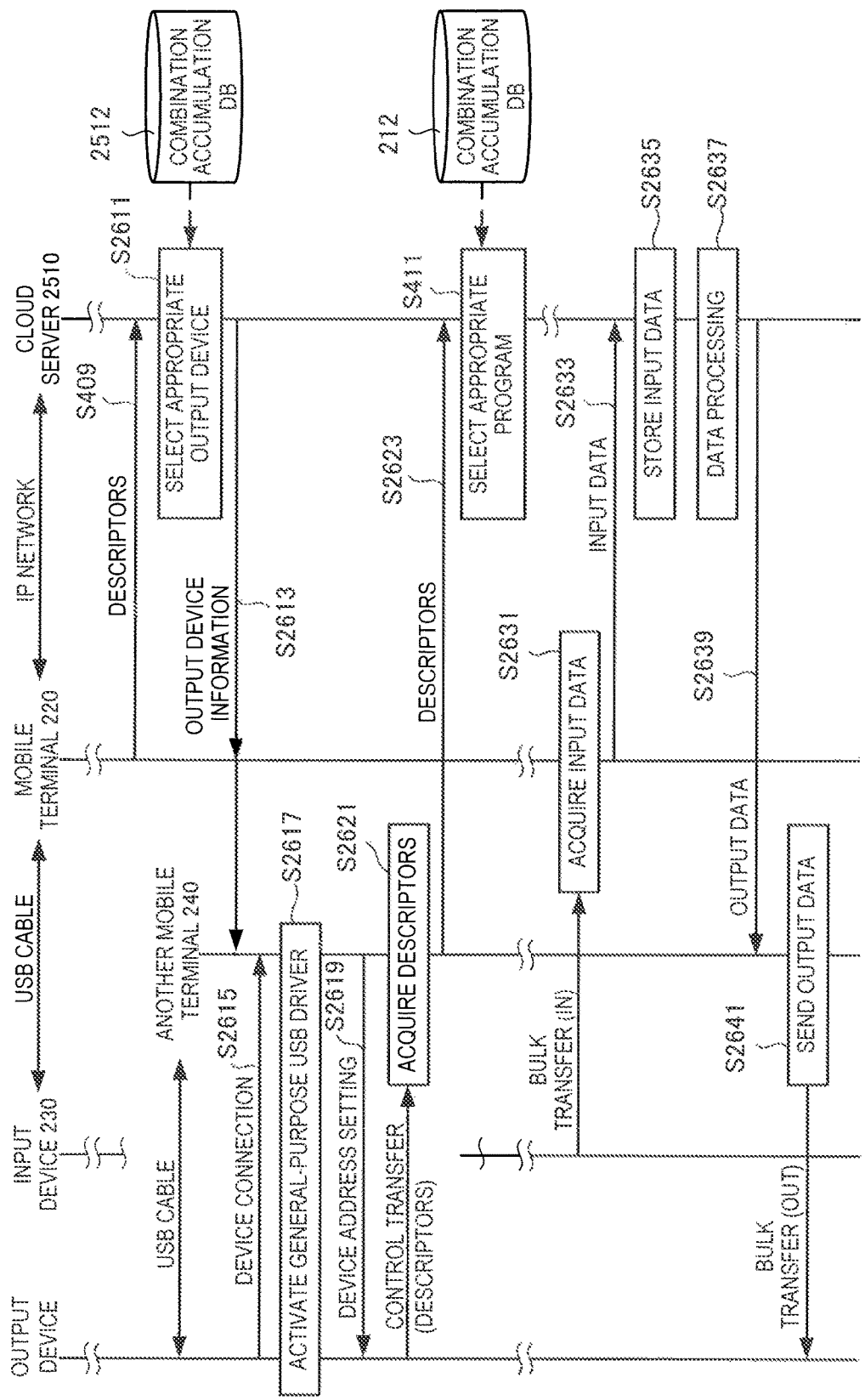
FIG. 26 is a sequence chart showing the operation procedure of the information processing system according to the fifth embodiment of the present invention.

FIG. 26 is a sequence chart showing the operation procedure of the information processing system 2500 according to this embodiment. Note that the same step numbers as in FIG. 4A of the second embodiment denote the same steps, and a description thereof will be omitted. Since the procedure up to descriptor acquisition is the same as in the second embodiment, FIG. 26 illustrates the procedure from descriptor transmission from the mobile terminal 220 to the cloud server 2510 in step S409.

In step S2611, the cloud server 2510 selects an appropriate output device corresponding to the device 230 that is an input device based on the combination accumulation DB 2512 that accumulates the past history. In step S2613, the cloud server 2510 transmits the output device information to the mobile terminal 220 or the other mobile terminal 240.

An example in which the corresponding output device is connected to the other mobile terminal 240 will be described below. However, the present invention is not limited to this. Processing at the time of USB device connection to the mobile terminal is the same as in FIG. 4A. First, in step S2615, the output device is connected to the USB connector of the mobile terminal 240 via a USB cable. In step S2617, a general-purpose USB driver is activated to start packet exchange between the mobile terminal 240 and the output device. The mobile terminal 240 clears the output device and then sets a device address using the mobile terminal 240 as a host in step S2619. In step S2621, the mobile terminal 240 acquires descriptors set in the output device. The descriptors include a device descriptor, a configuration descriptor, an interface descriptor, and an endpoint descriptor. In step S2623, the mobile terminal 240 IP-encapsulates the acquired descriptors and transmits them to the cloud server 2510. Program selection and activation processing from step S411 are the same as in FIG. 4A and are not illustrated.

After that, for example, data transfer from the input device to the output device is performed in the following way. In step S2631, the mobile terminal 220 acquires input data by bulk transfer (IN) from the input device to the mobile terminal 220. In step S2633, the mobile terminal 220 IP-encapsulates the input data and transmits it to the cloud server 2510. The cloud server 2510 acquires the input data by decapsulating the received packet and stores it in step S2635. In step S2637, data processing is performed as needed.

Next, in step S2639, the encapsulated output data is transmitted from the cloud server 2510 to the mobile terminal 240. The mobile terminal 240 generates the USB packet of the output data and sends it to the output device by bulk transfer (OUT) in step S2641.

<<Functional Arrangement of Cloud Server>>

Figure 27:
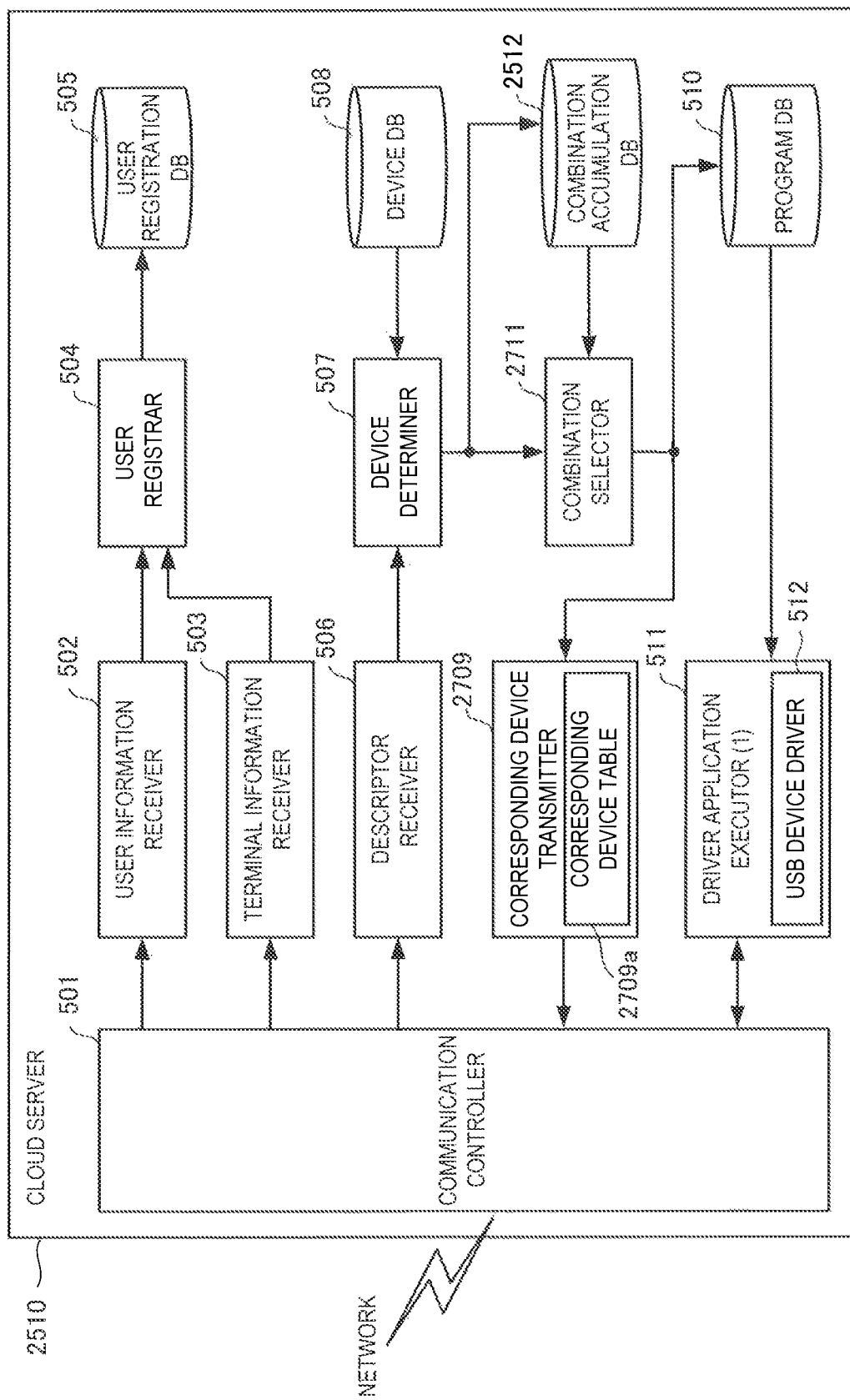
FIG. 27 is a block diagram showing the functional arrangement of a cloud server according to the fifth embodiment of the present invention.

FIG. 27 is a block diagram showing the functional arrangement of the cloud server 2510 according to this embodiment. Note that the same reference numerals as in FIG. 5 of the second embodiment denote the same functional components in FIG. 27, and a description thereof will be omitted. Connecting lines of the functional components corresponding to the processes of the second embodiment are deleted in order to avoid cumbersomeness.

A history of combinations of a device determined by a device determiner 507 based on descriptors is accumulated in the combination accumulation DB 2512 (see FIG. 28). A combination selector 2711 selects a corresponding device in accordance with device information connected to the mobile terminal 220 from the device determiner 507. The selected device information is transmitted from a corresponding device transmitter 2709 holding a corresponding device table 2709a (see FIG. 29) that stores corresponding devices to the mobile terminal.

(Combination Accumulation DB)

FIG. 28 is a view showing the arrangement of the combination accumulation DB 2512 according to this embodiment. Note that data shown in FIG. 28 can be accumulated in addition to the data shown in FIGS. 10 and 11 or data shown in FIG. 22.

FIG. 28 shows a database 2810 that accumulates the history of a correspondence between a first device and a second device. In this embodiment, for example, the first device is an input device, and the second device is an output device. The database 2810 stores a combination of a connected terminal 2812 including a mobile terminal, a device driver 2813, and a device application 2814 corresponding to a first device 2811. In correspondence with the combination, the database 2810 stores a combination of a connected terminal 2816 including a mobile terminal, a device driver 2817, and a device application 2818 corresponding to a second device 2815. A satisfaction level 2819 is stored in association with the whole combination.

(Corresponding Device Table)

Figure 29:
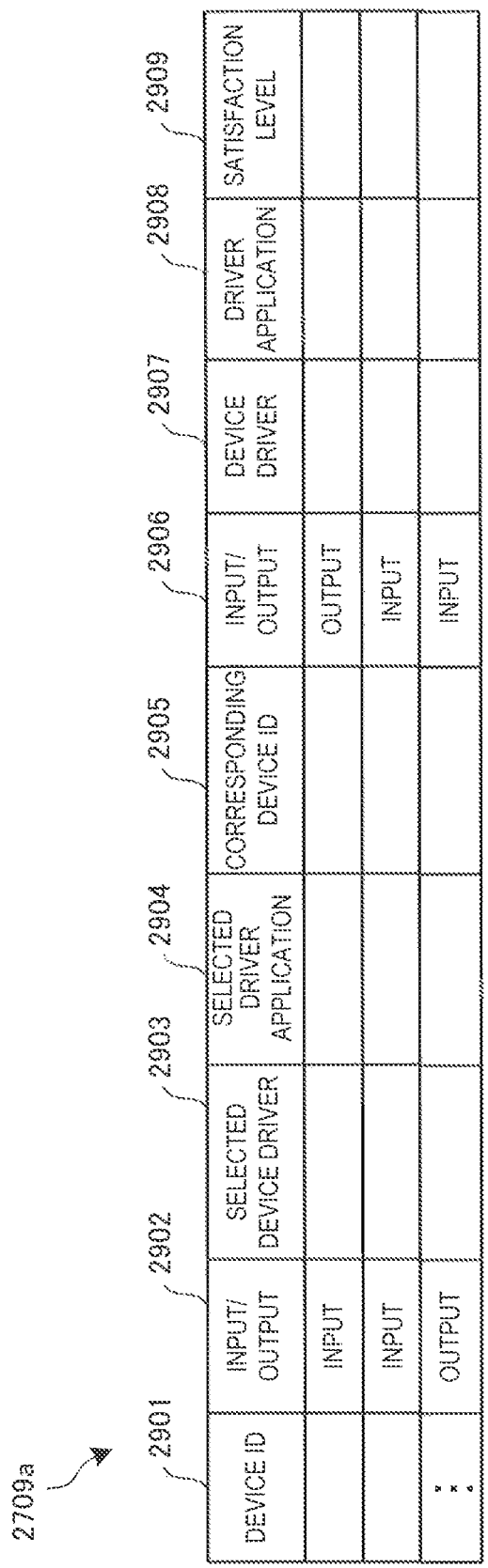
FIG. 29 is a view showing the arrangement of a corresponding device table according to the fifth embodiment of the present invention.

FIG. 29 is a view showing the arrangement of the corresponding device table 2709a according to this embodiment.

The corresponding device table 2709a stores an input/output 2902, a device driver 2903 selected in correspondence with the connected device, and a selected driver application 2904 in association with a device ID 2901 of the device connected to the mobile terminal 220. The corresponding device table 2709a also stores a device ID 2905 of an appropriate device selected in correspondence with the connected device, an input/output 2906, a device driver 2907 to be used, a driver application 2908 to be used, and a satisfaction level 2909.

<<Processing Procedure of Cloud Server>>

Figure 30:
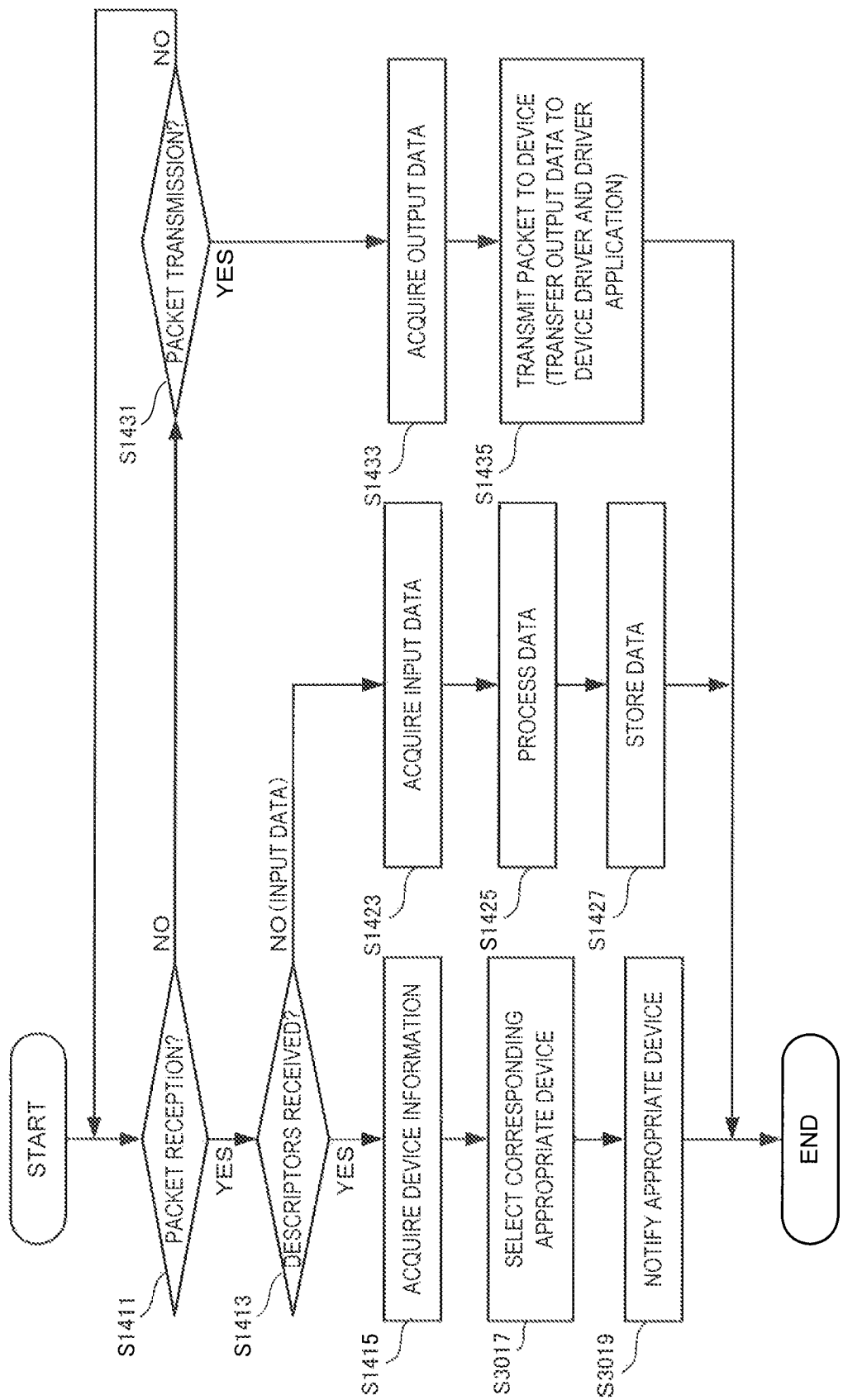
FIG. 30 is a flowchart showing the processing procedure of the cloud server according to the fifth embodiment of the present invention.

FIG. 30 is a flowchart showing the processing procedure of the cloud server 2510 according to this embodiment. This flowchart is executed by a CPU 1210 shown in FIG. 12 using a RAM 1240 and implements the functional components shown in FIG. 27. Note that the same step numbers as in FIG. 14 of the second embodiment denote the same steps, and a description thereof will be omitted.

In step S3017, the cloud server 2510 selects an appropriate device corresponding to the connected device by referring to the combination accumulation DB 2512 based on device information acquired in step S1415 from the device 230 connected to the mobile terminal 220. In step S3019, the cloud server 2510 notifies the mobile terminal 220 or 240 of the selected appropriate device.

Sixth Embodiment

An information processing system according to the sixth embodiment of the present invention will be described next. The information processing system according to this embodiment is different in that the user can choose the processes according to the second, fourth, and fifth embodiments from a mobile terminal. The rest of the components and operations is the same as in the second to fifth embodiments. Hence, the same reference numerals as in the second to fifth embodiments denote the same components and operations, and a detailed description thereof will be omitted.

According to this embodiment, the user can appropriately select a combination of the processes according to the second, fourth, and fifth embodiments.

<<Description of Operation of Information Processing System>>

Figure 31:
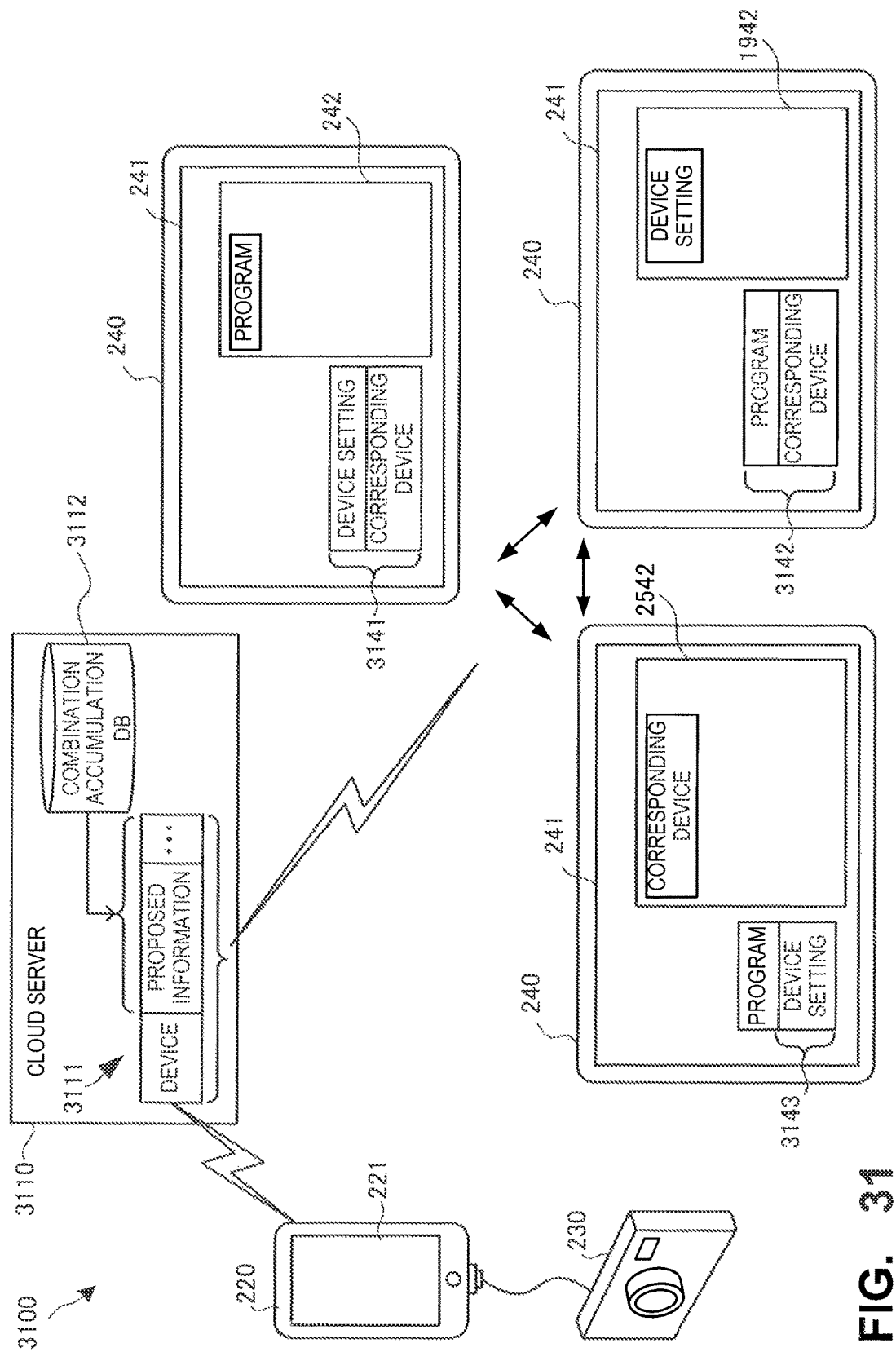
FIG. 31 is a view for explaining the operation of an information processing system according to the sixth embodiment of the present invention.

FIG. 31 is a view for explaining the operation of an information processing system 3100 according to this embodiment. Note that the same reference numerals as in FIG. 2 of the second embodiment. FIG. 19 of the fourth embodiment, or FIG. 25 of the fifth embodiment denote the same constituent elements, and a description thereof will be omitted.

The information processing system 3100 is an embodiment capable of combining the second, fourth, and fifth embodiments and switching the subjects of an appropriate combination. A cloud server 3110 includes a combination accumulation DB 3112 including FIGS. 10 and 11 of the second embodiment, FIG. 22 of the fourth embodiment, and FIG. 28 of the fifth embodiment. The cloud server 3110 also includes a table 3111 that switches between FIG. 13 of the second embodiment, FIG. 23 of the fourth embodiment, and FIG. 29 of the fifth embodiment.

Proposals from the cloud server 3110 to mobile terminals 240 are configured to be switched to each other by switches 3141, 3142, and 3143 displayed on them.

Note that the arrangement and operation of the cloud server 3110 are implemented by a combination of the second, fourth, and fifth embodiments, and a description thereof will be omitted.

Seventh Embodiment

An information processing system according to the seventh embodiment of the present invention will be described next. The information processing system according to this embodiment is different from the second to sixth embodiments in that the communication capacity (band) of a mobile terminal can be extended based on the predicted traffic of a connected device. The rest of the components and operations is the same as in the second to sixth embodiments. Hence, the same reference numerals as in the second to sixth embodiments denote the same components and operations, and a detailed description thereof will be omitted.

According to this embodiment, when a device is connected to the mobile terminal, the communication capacity to the device via a network and the mobile terminal can be selected in correspondence with the traffic of the device.

<<Information Processing System>>

The arrangement and operation of the information processing system according to this embodiment will be described with reference to FIGS. 32 and 33.

(Description of Operation)

Figure 32:
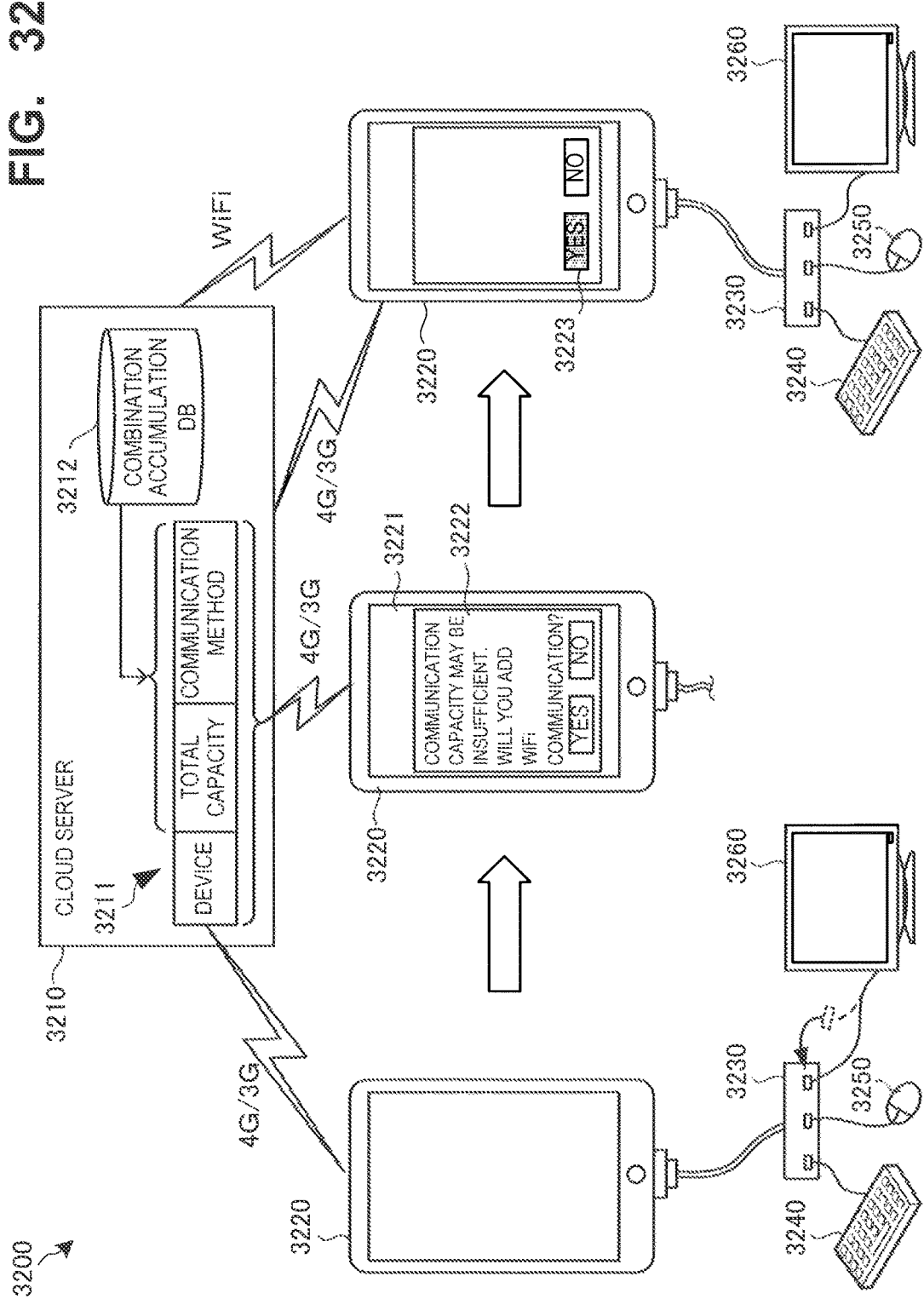
FIG. 32 is a view for explaining the operation of an information processing system according to the seventh embodiment of the present invention.

FIG. 32 is a view for explaining the operation of an information processing system 3200 according to this embodiment. Note that the same reference numerals as in the second to sixth embodiments denote the same constituent elements, and a description thereof will be omitted.

The information processing system 3200 shown in FIG. 32 includes a mobile terminal 3220 and a cloud server 3210 serving as an information processing apparatus. In the mobile terminal 3220 that is a smartphone, data communication by 4G/3G or the like and audio communication by WiFi (Wireless Fidelity) can simultaneously operate. An adapter 3230 is connected to the mobile terminal 3220 via a USB cable. The adapter 3230 has a plurality of connectors. In the cloud server 3210, a combination selector 3211 selects an appropriate communication method corresponding to the device connected to the mobile terminal 3220 by referring to a combination accumulation DB 3212 that accumulates the history of combinations of a communication method and a communication capacity sufficient for the traffic predicted for the connected device.

FIG. 32 shows a state in which when a keyboard 3240 and a pointing device 3250 are already connected to the mobile terminal 3220 and operating, a large display 3260 is additionally connected to the mobile terminal 3220. At the beginning, the mobile terminal 3220 and the cloud server 3210 perform control and data input/output from/to the keyboard 3240 and the pointing device 3250 by 4G or 3G communication.

When the large display 3260 is connected, and it is revealed from the predicted traffic that the communication capacity of the mobile terminal 3220 in 4G or 3G may be insufficient, a message "Communication capacity may be insufficient. Will you add WiFi communication?" is notified on the mobile terminal 3220, as shown in the central view of FIG. 32.

When the user touches a "YES" button 3223, communication between the cloud server 3210 and the mobile terminal 3220 is performed by both 4G/3G and WiFi, as shown in the right view of FIG. 32, so as to increase the communication capacity and cover an increase in the traffic.

Note that in fact, it is impossible to discriminate the routes of the two communication methods in the IP network from each other. The two communication methods are separated at the final stage of wireless communication with the mobile terminal 220. The communication methods are not limited to 4G, 3G and WiFi. A plurality of communication channels held by the mobile terminal 3220 are used to increase the communication capacity. FIG. 32 shows an example in which the number of connected devices increases. However, for example, the cloud server 3210 may predict an environmental change such as a decrease in the communication capacity and perform processing of increasing the communication capacity using a plurality of communication channels.

Note that in FIG. 32, communication channel addition is proposed on the mobile terminal 3220 connected to the device. However, it may be proposed on a display screen 241 of another mobile terminal 240, as in the above-described embodiments.

(Operation Procedure)

Figure 33:
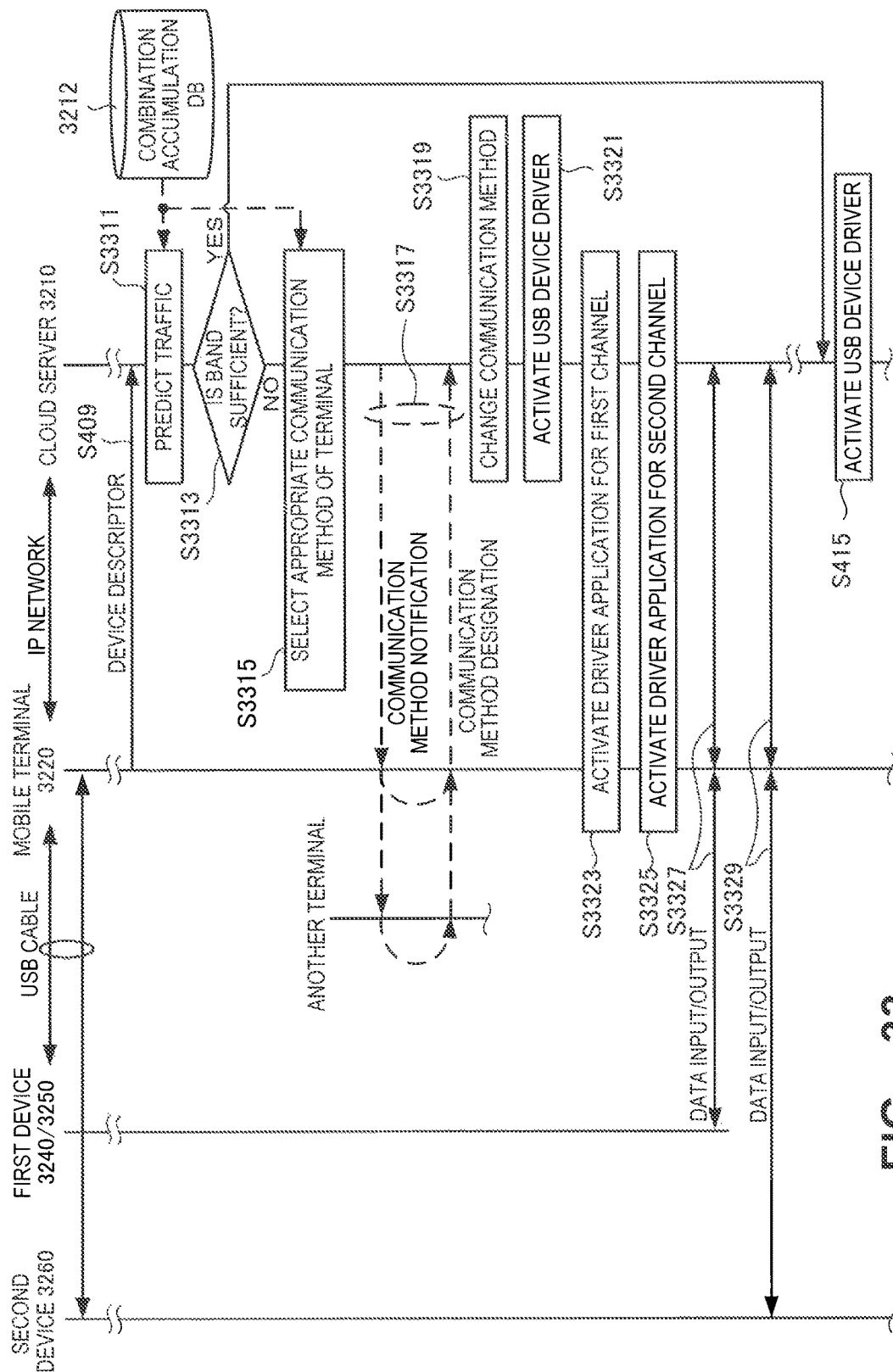
FIG. 33 is a sequence chart showing the operation procedure of the information processing system according to the seventh embodiment of the present invention.

FIG. 33 is a sequence chart showing the operation procedure of the information processing system 3200 according to this embodiment. Note that the same step numbers as in FIG. 4A of the second embodiment denote the same steps in FIG. 18, and a description thereof will be omitted. Since the procedure up to descriptor acquisition is the same as in the second embodiment, FIG. 33 illustrates the procedure from descriptor transmission from the mobile terminal 3220 to the cloud server 2510 in step S409.

In step S3311, the cloud server 3210 predicts the traffic between the cloud server 3210 and the mobile terminal 3220 based on the combination accumulation DB 3212 that accumulates the past history. In step S3313, the cloud server 3210 determines whether the communication capacity (band) is sufficient for the predicted traffic. This determination is preferably done based on whether the communication capacity exceeds the maximum value or several tens of percentage of the predicted traffic. If the communication capacity is sufficient, the cloud server 3210 advances to step S415 and activates a USB device driver. From then on, the same processing as in FIG. 4A is performed.

On the other hand, if the communication capacity is insufficient, the cloud server 3210 advances to step S3315 and selects an appropriate communication method between the cloud server 3210 and the mobile terminal 3220 based on the combination accumulation DB 3212 that accumulates the past history. In step S3317, the cloud server 3210 proposes a change of the communication method to the mobile terminal 3220 or 240 and queries the user. Note that the cloud server 3210 may automatically change the communication method to an appropriate one without query in step S3317.

Upon receiving a communication method designation from the user, the cloud server 3210 changes the communication method to the designated communication method in step S3319. In step S3321, the cloud server 3210 activates a USB device driver. In step S3323, the cloud server 3210 activates a driver application for the first channel. In step S3325, the cloud server 3210 activates a driver application for the second channel. When the programs are activated, input/output from/to the first device (keyboard 3240/pointing device 3250) is executed in step S3327, and input/output from/to the added second device (large display 3260) is executed in step S3329.

Note that division between the first device and the second device may be different from that shown in FIG. 33. Alternatively, input data and output data may be divided and communicated via different channels.

<<Functional Arrangement of Cloud Server>>

Figure 34:
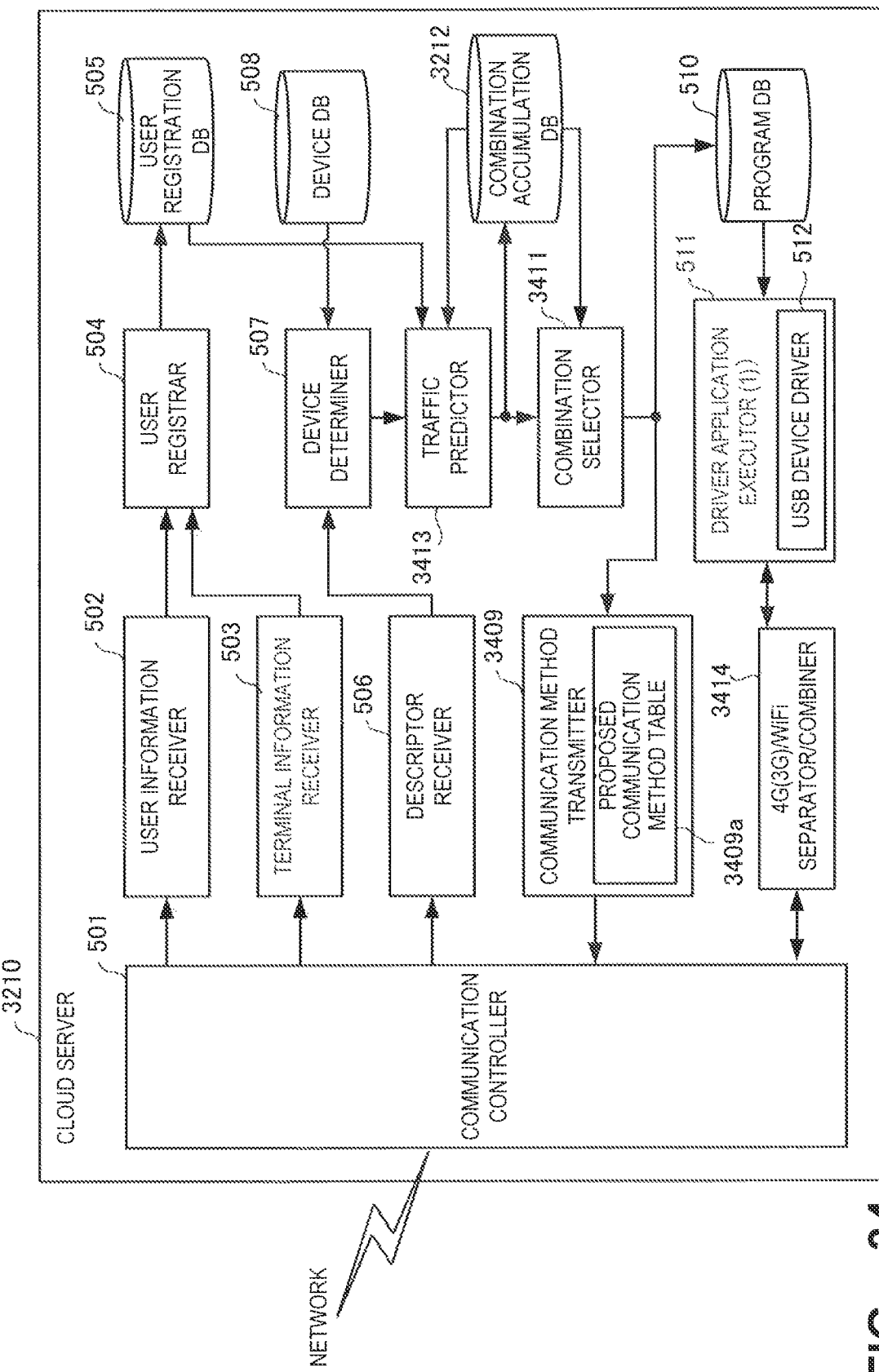
FIG. 34 is a block diagram showing the functional arrangement of a cloud server according to the seventh embodiment of the present invention.

FIG. 34 is a block diagram showing the functional arrangement of the cloud server 3210 according to this embodiment. Note that the same reference numerals as in FIG. 5 of the second embodiment denote the same functional components in FIG. 34, and a description thereof will be omitted. Connecting lines of the functional components corresponding to the processes of the second embodiment are deleted in order to avoid cumbersomeness.

Figure 36:
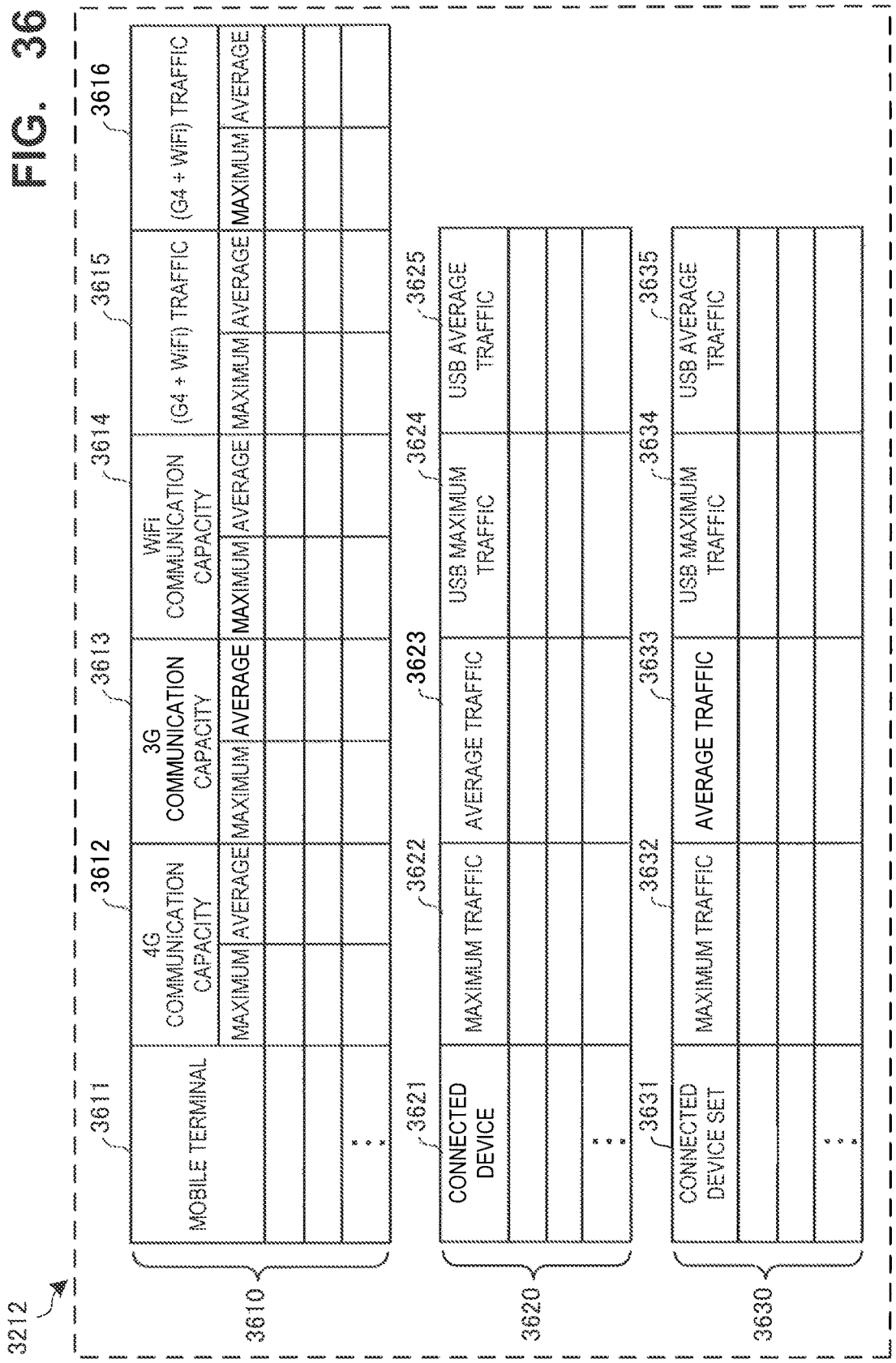
FIG. 36 is a view showing the arrangement of a combination accumulation DB according to the seventh embodiment of the present invention.

A history of combinations of a connected device determined by a device determiner 507 based on descriptors and combinations of a corresponding traffic and communication method are accumulated in the combination accumulation DB 3212 (see FIG. 36). A traffic predictor 3413 predicts a traffic by referring to the combination accumulation DB 3212 based on the device connected to the mobile terminal 3220. A combination selector 3411 selects an appropriate communication method in accordance with the traffic predicted by the traffic predictor 3413. The selected communication method is transmitted from a communication method transmitter 3409 holding a proposed communication method table 3409*a* (see FIG. 37) that stores the proposal of communication methods to the mobile terminal.

A 4G(3G)/WiFi separator/combiner 3414 separates the transmission data communication path to the mobile terminal 3220 into 4G/3G and WiFi or combines data received from the mobile terminal 3220.

<<Functional Arrangement of Mobile Terminal>>

Figure 35:
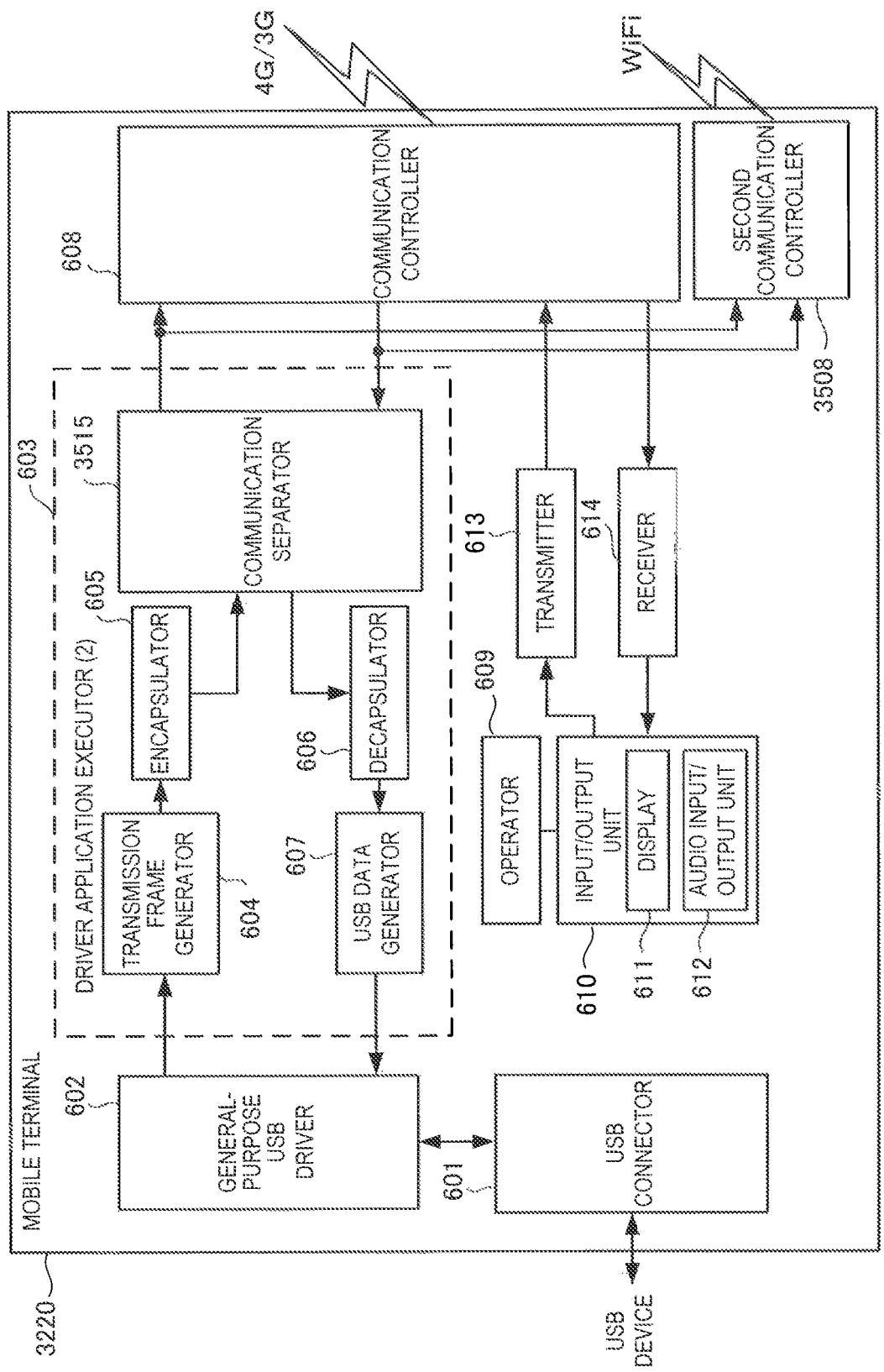
FIG. 35 is a block diagram showing the functional arrangement of a mobile terminal according to the seventh embodiment of the present invention.

FIG. 35 is a block diagram showing the functional arrangement of the mobile terminal 3220 according to this embodiment. Note that the same reference numerals as in FIG. 6 of the second embodiment denote the same functional components in FIG. 35, and a description thereof will be omitted.

A communication separator 3515 separates the communication path to the cloud server 3210 into 4G/3G and WiFi. A communication controller 608 that is the same as in FIG.

6 performs 4G/3G communication, and a second communication controller 3508 performs WiFi communication.

(Combination Accumulation DB)

FIG. 36 is a view showing the arrangement of the combination accumulation DB 3212 according to this embodiment.

The upper stage of the combination accumulation DB 3212 shows history data 3610 of communication capacities in each communication method of the mobile terminal. The communication capacity history data 3610 stores a communication capacity 3612 of only 4G, a communication capacity 3613 of only 3G, a communication capacity 3614 of only WiFi, a communication capacity 3615 of 4G+WiFi, and a communication capacity 3616 of 3G+WiFi in association with a mobile terminal 3611.

The middle stage of the combination accumulation DB 3212 shows history data 3620 of a traffic corresponding to each connected device. The traffic history data 3620 stores a maximum traffic 3622, an average traffic 3623, a maximum traffic 3624 of USB, and an average traffic 3625 of USB in association with each connected device 3621. Note that for device connection other than USB, a corresponding maximum traffic and average traffic are stored.

The lower stage of the combination accumulation DB 3212 shows history data 3630 of a traffic corresponding to each connected device set. That is, this history data is prepared because when a plurality of devices are connected, the total traffic may be different from the sum of traffics of the individual devices. The traffic history data 3630 of the connected device set stores a maximum traffic 3632, an average traffic 3633, a maximum traffic 3634 of USB, and an average traffic 3635 of USB in association with each connected device set 3631. Note that for device connection other than USB, a corresponding maximum traffic and average traffic are stored. If USB and another device connection coexist, a history of traffic of the combination is stored.

(Proposed Communication Method Table)

Figure 37:
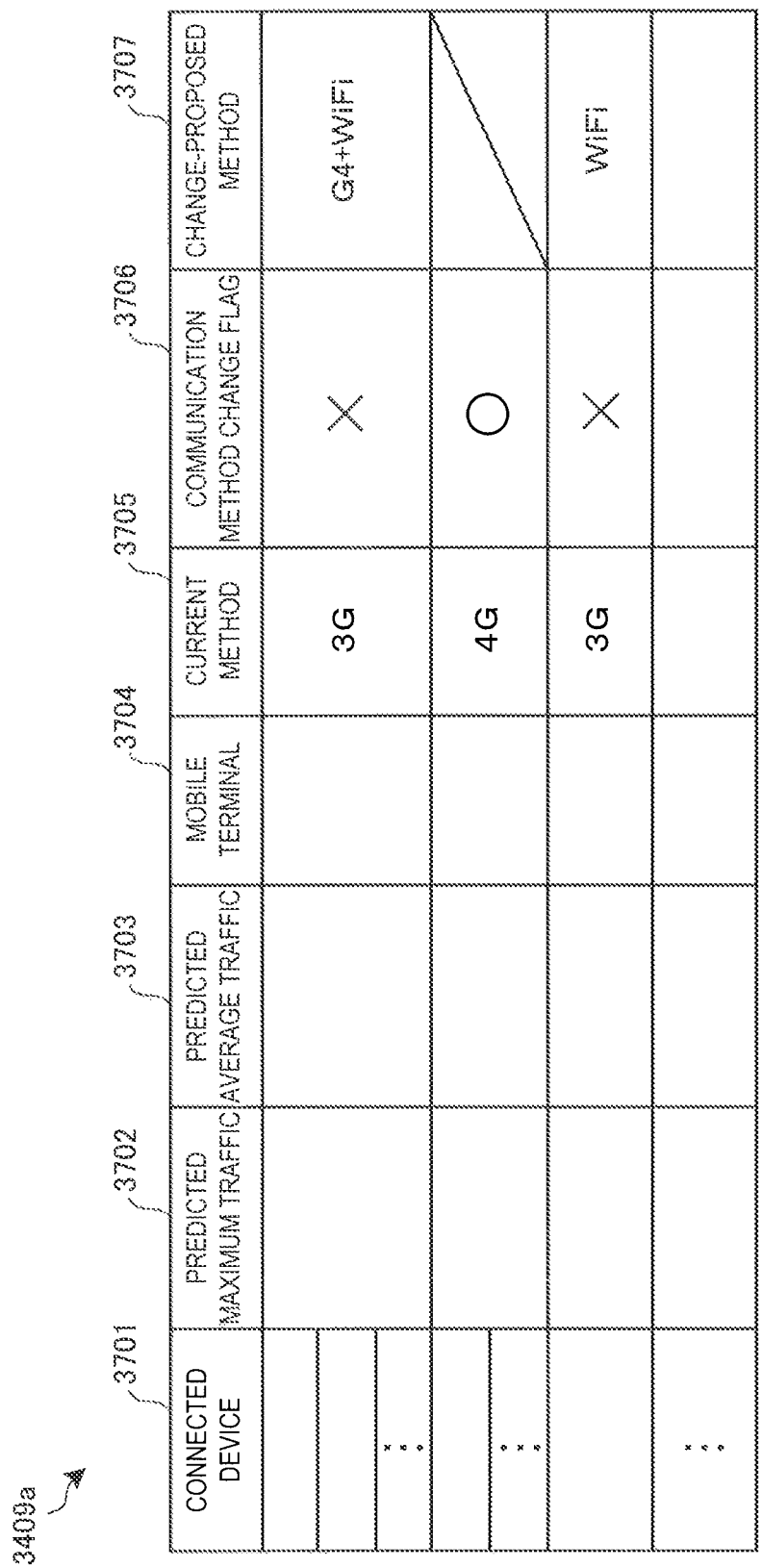
FIG. 37 is a view showing the arrangement of a proposed communication method table according to the seventh embodiment of the present invention.

FIG. 37 is a view showing the arrangement of the proposed communication method table 3409a according to this embodiment.

The proposed communication method table 3409a stores a predicted maximum traffic 3702, a predicted average traffic 3703, a connected mobile terminal 3704, a current communication method 3705, a communication method change flag 3706, and a change-proposed method 3707 in association with a connected device or connected device set 3701. For example, in the first line, a change from 3G to 4G+WiFi is proposed. In the second line, since the communication capacity is sufficient, the communication method need not be changed. In the third line, a change from 3G to WiFi is proposed.

<<Processing Procedure of Cloud Server>>

Figure 38:
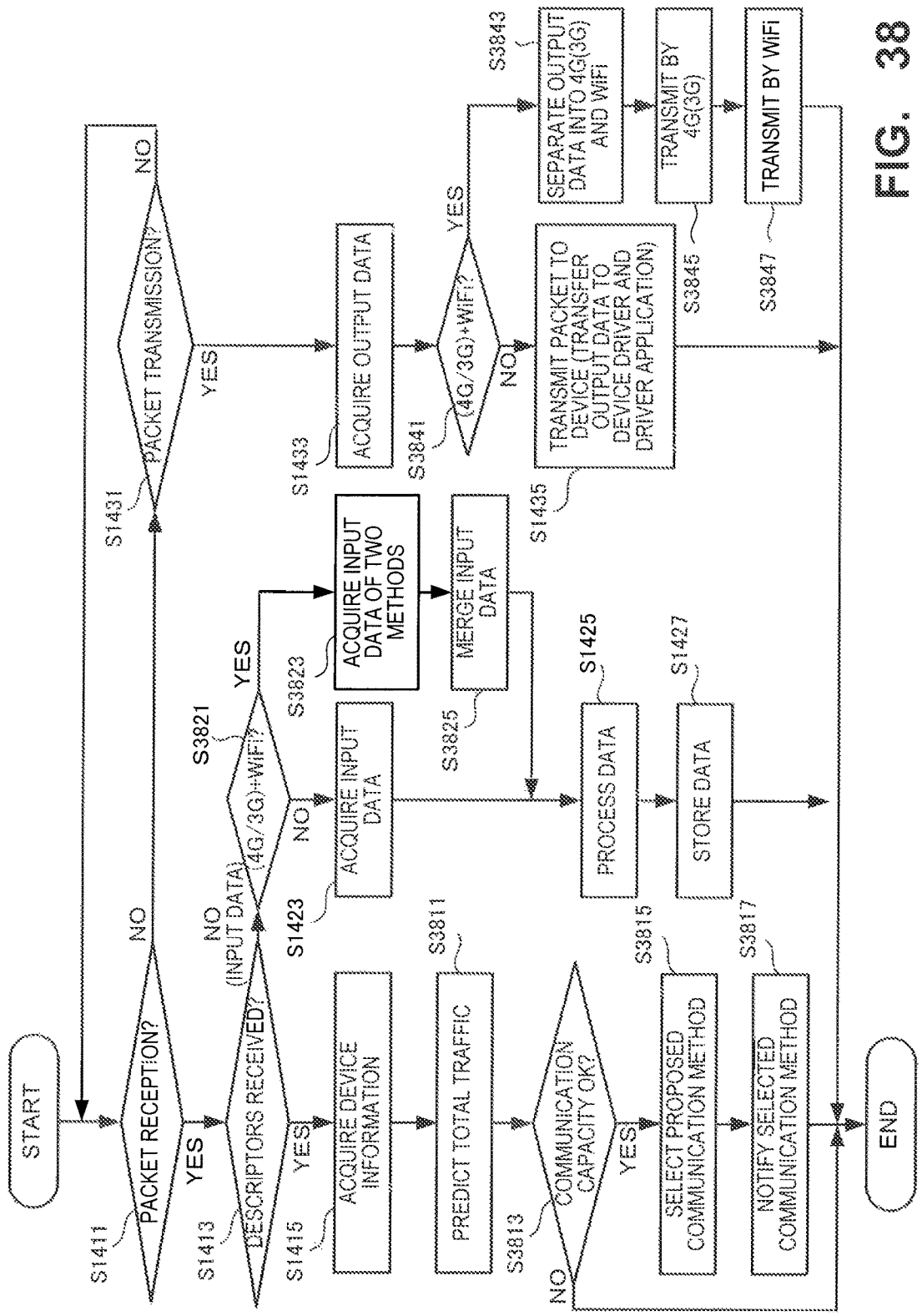
FIG. 38 is a flowchart showing the processing procedure of the cloud server according to the seventh embodiment of the present invention.

FIG. 38 is a flowchart showing the processing procedure of the cloud server 3210 according to this embodiment. This flowchart is executed by a CPU 1210 shown in FIG. 12 using a RAM 1240 and implements the functional components shown in FIG. 38. Note that the same step numbers as in FIG. 14 of the second embodiment denote the same steps, and a description thereof will be omitted.

In step S3811, the cloud server 3210 predicts the total traffic of the connected device by referring to the combination accumulation DB 3212 based on device information acquired from the device connected to the mobile terminal 3220 in step S1415. In step S3813, the cloud server 3210 determines whether the communication capacity of the mobile terminal 3220 is OK for communication of the predicted traffic. If the communication capacity is OK, the cloud server 3210 ends the processing. If the communication capacity is insufficient, the cloud server 3210 advances to step S3815 and selects an appropriate communication method to be proposed by referring to the combination accumulation DB 3212. The cloud server 3210 notifies the mobile terminal 3220 of the selected communication method.

When input data from the device is received upon packet reception, the cloud server 3210 determines in step S3821 whether the selected communication method is 4G/3G+WiFi. If the communication method is 4G/3G+WiFi, the cloud server 3210 advances to step S3823 and acquires the input data by the two methods. In step S3825, the cloud server 3210 merges the input data acquired by the two methods as needed.

On the other hand, to transmit a packet to the mobile terminal 3220, the cloud server 3210 advances to step S3841 and determines whether the selected communication method is 4G/3G+WiFi. If the communication method is 4G/3G+WiFi, the cloud server 3210 advances to step S3843 and separates the acquired output data into 4G/3G and WiFi. The separation method is not limited. A separation method that increases the communication capacity and suppresses an increase in the load on the mobile terminal 3220 as much as possible is preferably used. In step S3845, the cloud server 3210 performs packet transmission by 4G or 3G. In step S3847, the cloud server 3210 performs packet transmission by WiFi.

Eighth Embodiment

An information processing system according to the eighth embodiment of the present invention will be described next. The information processing system according to this embodiment is different from the second to seventh embodiments in that the mobile terminal is replaced with a router. The rest of the components and operations is the same as in the second and seventh embodiments. Hence, the same reference numerals as in the second and seventh embodiments denote the same components and operations, and a detailed description thereof will be omitted.

According to this embodiment, when a device is connected to the router, a combination of a device driver and a driver application which appropriately control the device via the network and the router can be selected.

<<Description of Operation of Information Processing System>>

Figure 39:
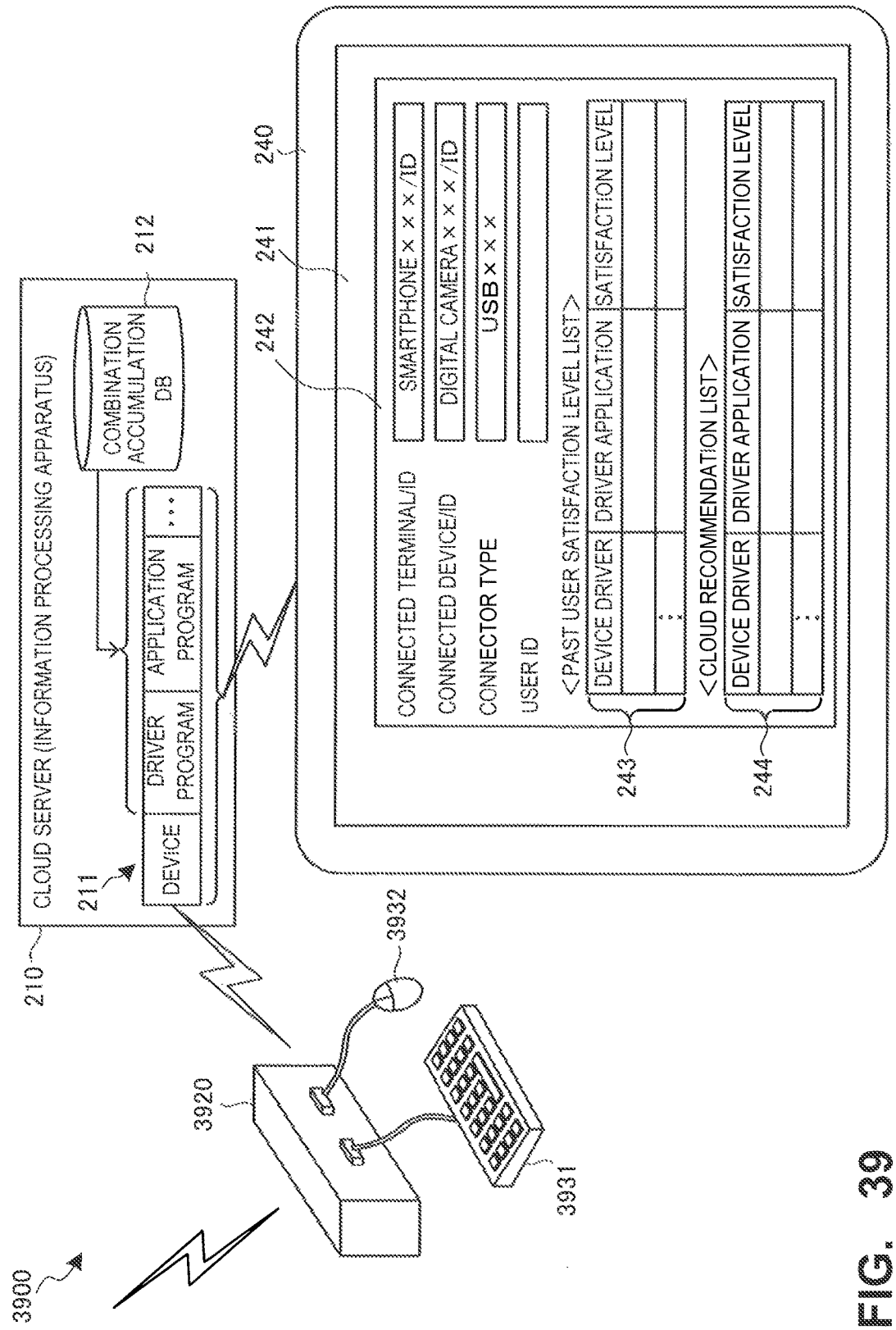
FIG. 39 is a view for explaining the operation of an information processing system according to the eighth embodiment of the present invention.

FIG. 39 is a view for explaining the operation of an information processing system 3900 according to this embodiment. Note that the same reference numerals as in FIG. 2 of the second embodiment denote the same constituent elements in FIG. 39, and a description thereof will be omitted.

A router 3920 exists on the communication path from a cloud server 210, and has a plurality of device connectors. The device connectors are preferably USB connectors. A keyboard 3931 and a pointing device 3932 are connected to the router 3920. The cloud server 210 can perform the same processing as in the second embodiment by handling the router 3920 as a terminal having no specific data processing function.

Ninth Embodiment

An information processing system according to the ninth embodiment of the present invention will be described next.

The information processing system according to this embodiment is different from the second to eighth embodiments in that the mobile terminal or router is replaced with a notebook PC. The rest of the components and operations is the same as in the second and eighth embodiments. Hence, the same reference numerals as in the second and eighth embodiments denote the same components and operations, and a detailed description thereof will be omitted.

According to this embodiment, when a device is connected to the notebook PC, a combination of a device driver and a driver application which appropriately control the device via the network and the notebook PC can be selected.

<<Description of Operation of Information Processing System>>

Figure 40:
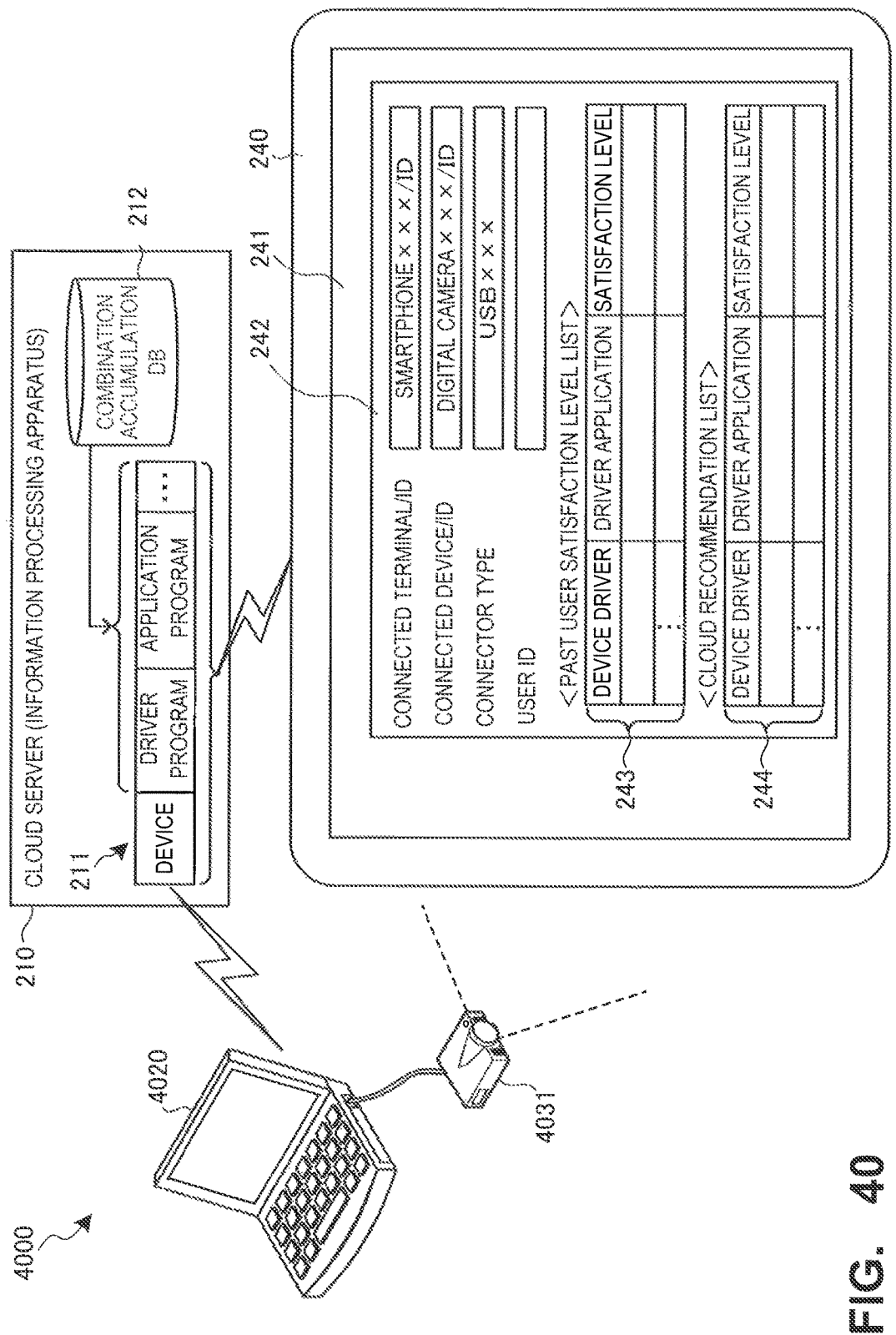
FIG. 40 is a view for explaining the operation of an information processing system according to the ninth embodiment of the present invention.

FIG. 40 is a view for explaining the operation of an information processing system 4000 according to this embodiment. Note that the same reference numerals as in FIG. 2 of the second embodiment denote the same constituent elements in FIG. 40, and a description thereof will be omitted.

A projector 4031 is connected to a notebook personal computer (to be referred to as a PC hereinafter) 4020 via a USB cable. A cloud server 210 selects a device driver and a driver application by referring to a combination accumulation DB 212 and activates them.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention on the computer, a storage medium storing the program, and a WWW (World Wide Web) server that causes a user to download the program.

This application claims the benefit of Japanese Patent Application No. 2012-068514 filed on Mar. 24, 2012, which is hereby incorporated by reference herein in its entirety.

The invention claimed is:

1. An information processing apparatus comprising:
an accumulator that accumulates a history of a combination of a device, that is connected to the information processing apparatus via a network and a mobile terminal, and programs, that are used in the information processing apparatus to operate the device; and
a selector that, selects the combination of the device and the programs based on the history of the combination of the device and the programs accumulated in said accumulator, when receiving information about the device connected to the mobile terminal from the mobile terminal via the network
wherein the programs are accumulated and selected as an appropriate program combination of a device driver program driving the device, and a driver application program controlling the device via the network and the mobile terminal.

2. The information processing apparatus according to claim 1, further comprising a transmitter that transmits the combination of the device and the programs selected by said selector to a mobile terminal designated by the user via the network.

3. The information processing apparatus according to claim 1, wherein
said accumulator further accumulates a combination of environmental factors on using the device, and
said selector further selects the combination of the environmental factors to control the device connected to the mobile terminal by referring said accumulator.

4. The information processing apparatus according to claim 1, wherein
said accumulator further accumulates a combination of an input device and an output device, and
said selector further selects the combination of the input device and the output device including the device connected to the mobile terminal by referring said accumulator.

5. The information processing apparatus according to claim 4, further comprising a chooser that chooses one of the selection of the combination of the device and the programs, the selection of the combination of the environmental factors, and the selection of the combination of the input device and the output device.

6. The information processing apparatus according to claim 1, wherein said selector selects a combination having a maximum appearance count out of the combinations accumulated in the accumulator.

7. The information processing apparatus according to claim 1, wherein
said accumulator accumulates a satisfaction level of the user in association with the combination, and said selector further selects the combination by referring to the satisfaction level of the user.

8. The information processing apparatus according to claim 7, wherein said selector selects a combination having a maximum satisfaction level of the user who has connected the device to the mobile terminal out of the combinations accumulated in the accumulator.

9. The information processing apparatus according to claim 7, wherein said selector selects a combination having a maximum sum of the satisfaction levels out of the combinations accumulated in the accumulator.

10. The information processing apparatus according to claim 1, wherein
said accumulator further accumulates a combination of a traffic and a communication method between the information processing apparatus and the mobile terminal, and
said selector further selects the combination of the traffic and the communication method to process the device connected to the mobile terminal by referring to said accumulator.

11. The information processing apparatus according to claim 1, further comprising an acquirer that acquires the information about the device connected to the mobile terminal from the device via the network and the mobile terminal, wherein said selector obtains the information about the device connected to the mobile terminal from said acquirer.

12. A control method of an information processing apparatus, the method comprising:
accumulating a history of a combination of a device, that is connected to the information processing apparatus via a network and a mobile terminal, and programs, that are used in the information processing apparatus to operate the device; and selecting the combination of the device and the programs based on the history of the combination of the device and the programs accumulated in the accumulator, when receiving information about the device connected to the mobile terminal from the mobile terminal via the network wherein the programs are accumulated and selected as an appropriate program combination of a device driver program driving the device, and a driver application program controlling the device via the network and the mobile terminal.

13. A non-transitory computer-readable storage medium storing a control program of an information processing apparatus, which causes a computer to execute:

accumulating a history of a combination of a device, that is connected to the information processing apparatus via a network and a mobile terminal, and programs, that are used in the information processing apparatus to operate the device; and selecting the combination of the device and the programs based on the history of the combination of the device and the programs accumulated in the accumulator, when receiving information about the device connected to the mobile terminal from the mobile terminal via the network, wherein the programs are accumulated and selected as an appropriate program combination of a device driver program driving the device, and a driver application program controlling the device via the network and the mobile terminal.

14. An information processing system including a mobile terminal and an information processing apparatus connected to said mobile terminal via a network, said information processing apparatus comprising:

an accumulator that accumulates a history of a combination of a device, that is connected to the information processing apparatus via the network and said mobile terminal, and programs, that are used in said information processing apparatus to operate the device; and a selector that selects the combination of the device and the programs based on the history of the combination of the device and the programs accumulated in said accumulator, when receiving information about the device connected to said mobile terminal from said mobile terminal via the network, and said mobile terminal comprising a transmitter that transmits the information about the device connected to said mobile terminal to said information processing apparatus via the network, wherein the programs are accumulated and selected as an appropriate program combination of a device driver program driving the device, and a driver application program controlling the device via the network and the mobile terminal.

15. The information processing system according to claim 14, wherein said information processing apparatus further comprises a transmitter that transmits the combination of the device and the programs selected by said selector to a mobile terminal designated by the user via the network.

16. The information processing system according to claim 14, wherein said accumulator further accumulates a combination of environmental factors on using the device, and said selector further selects the combination of the environmental factors to control the device connected to said mobile terminal by referring to said accumulator.

17. The information processing system according to claim 14, wherein said accumulator further accumulates a combination of an input device and an output device, and said selector further selects the combination of the input device and the output device including the device connected to said mobile terminal by referring to said accumulator.

18. The information processing system according to claim 17, wherein said information processing apparatus further comprises a chooser that chooses one of the selection of the combination of the device and the programs, the selection of the combination of the environmental factors, and the selection of the combination of the input device and the output device.

19. The information processing system according to claim 14, wherein said selector selects a combination having a maximum appearance count out of the combinations accumulated in the accumulator.

20. The information processing system according to claim 14, wherein said accumulator accumulates a satisfaction level of the user in association with the combination, and said selector further selects the combination by referring to the satisfaction level of the user.

21. The information processing system according to claim 20, wherein said selector selects a combination having a maximum satisfaction level of the user who has connected the device to said mobile terminal out of the combinations accumulated in the accumulator.

22. The information processing system according to claim 20, wherein said selector selects a combination having a maximum sum of the satisfaction levels out of the combinations accumulated in the accumulator.

23. The information processing system according to claim 14, wherein said accumulator further accumulates a combination of a traffic and a communication method between said information processing apparatus and said mobile terminal, and said selector further selects the combination of the traffic and the communication method to process the device connected to said mobile terminal by referring to said accumulator.

24. The information processing system according to claim 14, wherein said information processing apparatus further comprises an acquirer that acquires the information about the device connected to said mobile terminal from the device via the network and said mobile terminal, and said selector obtains the information about the device connected to said mobile terminal from said acquirer.

25. The information processing system according to claim 14, wherein said mobile terminal further comprises:

a connector that connects a device;

a transmitter that acquires device information for the connected device and transmits the device information to an information processing apparatus via a network; and an instructor that instructs to transmit, to another mobile terminal, a combination of the device and a program programs operating the device, which are selected by said information processing apparatus based on the device information.

26. The information processing system according to claim 14, wherein said mobile terminal further comprises:

a requester that requests, from said information processing apparatus via the network, the combination of the device and the programs operating the device, which is selected based on the device information of the device connected to the other mobile terminal; and a display that displays the combination of the device and the programs received from said information processing apparatus via the network.

27. An information processing method of an information processing system including a mobile terminal, and an information processing apparatus connected to the mobile terminal via a network and including an accumulator, said accumulator accumulating a history of a combination of a device, that is connected to the information processing apparatus via the network and the mobile terminal, and programs that are used in the information processing apparatus to operate the device, the method comprising:

transmitting information about the device connected to the mobile terminal from the mobile terminal to the information processing apparatus via the network; and selecting, by the information processing apparatus, the combination of the device and the programs based on the history of the combination of the device and the programs accumulated in the accumulator, when receiving the information about the device connected to the mobile terminal from the mobile terminal via the network, wherein the programs are accumulated and selected as an appropriate program combination of a device driver program driving the device, and a driver application program controlling the device via the network and the mobile terminal.

* * * * *